United States Patent
Nishimura

(10) Patent No.: US 9,143,453 B2
(45) Date of Patent: Sep. 22, 2015

(54) RELAY APPARATUS AND BUFFER CONTROL METHOD

(71) Applicant: FUJITSU LIMITED, Kawasaki-shi, Kanagawa (JP)

(72) Inventor: Kazuto Nishimura, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 63 days.

(21) Appl. No.: 14/069,900

(22) Filed: Nov. 1, 2013

(65) Prior Publication Data

US 2014/0177443 A1     Jun. 26, 2014

(30) Foreign Application Priority Data

Dec. 21, 2012 (JP) ................. 2012-280052

(51) Int. Cl.
*H04L 12/801* (2013.01)
(52) U.S. Cl.
CPC ....................... *H04L 47/12* (2013.01)
(58) Field of Classification Search
CPC ........ H04L 47/12; H04L 47/50; H04L 47/562
See application file for complete search history.

(56) References Cited

U.S. PATENT DOCUMENTS 6,173,331 B1    1/2001  Shimonishi
6,975,630 B1 *  12/2005 Kusumoto ............... 370/395.41

FOREIGN PATENT DOCUMENTS

JP          11-112527 A    4/1999
JP          2006-197235 A  7/2006

* cited by examiner

*Primary Examiner* — Mohammad Anwar
(74) *Attorney, Agent, or Firm* — Arent Fox LLP

(57) ABSTRACT

A relay apparatus that transfers data with an identifier corresponding to a transfer rate attached thereto and stores data as a transfer target to adjust the transfer rate, the relay apparatus includes multiple buffers that are respectively associated with multiple time regions that serve as targets to be successively read from a current point of time onward, each buffer having a capacity to store an amount of data determined in accordance with the transfer rate of the identifier, and a controller that reduces a size of a buffer corresponding to a second time region to be smaller than a size of a buffer corresponding to a first time region prior to the second time region in accordance with a time difference between the current point of time and the second time region.

19 Claims, 33 Drawing Sheets

FIG. 6

| | | | 122 |
|---|---|---|---|
| BUFFER MANAGEMENT TABLE | | | |
| TR | UPPER LIMIT VALUE | CURRENT QUEUE LENGTH | FLAG CURRENTLY BEING READ |
| TR1 | 100 k | 95 k | true |
| TR2 | 100 k | 89 k | false |
| ... | ... | ... | ... |
| TR50 | 100 k | 41 k | false |
| TR51 | 50 k | 38 k | false |
| TR52 | 50 k | 35 k | false |
| ... | ... | ... | ... |
| TR100 | 50 k | 78 k | false |
| TR101 | 10 k | 66 k | false |
| TR102 | 10 k | 40 k | false |
| ... | ... | ... | ... |
| TR350 | 10 k | 0 | false |

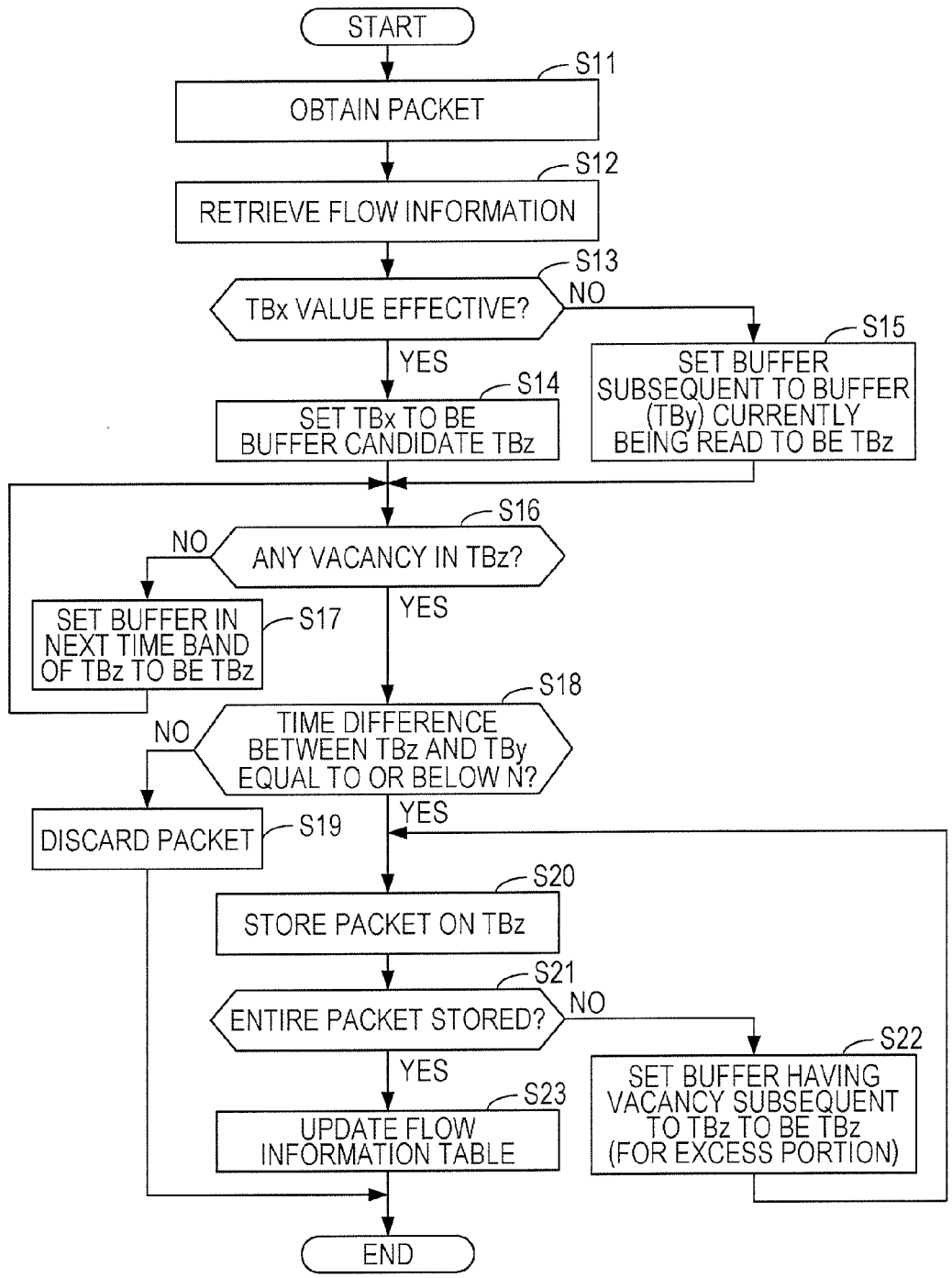

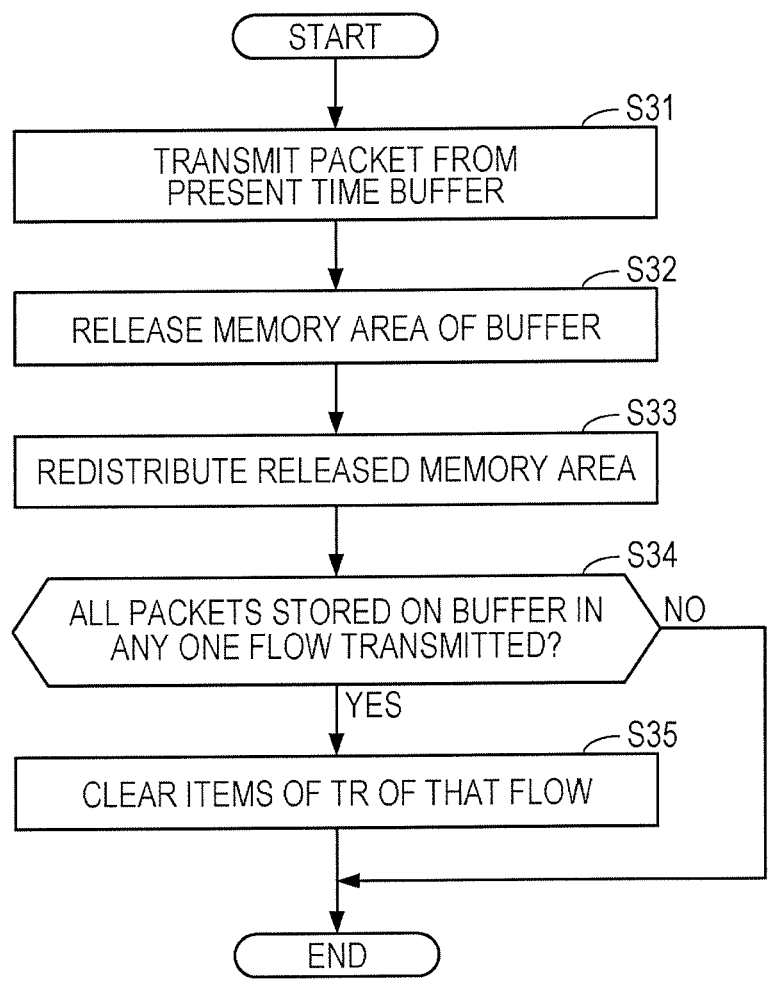

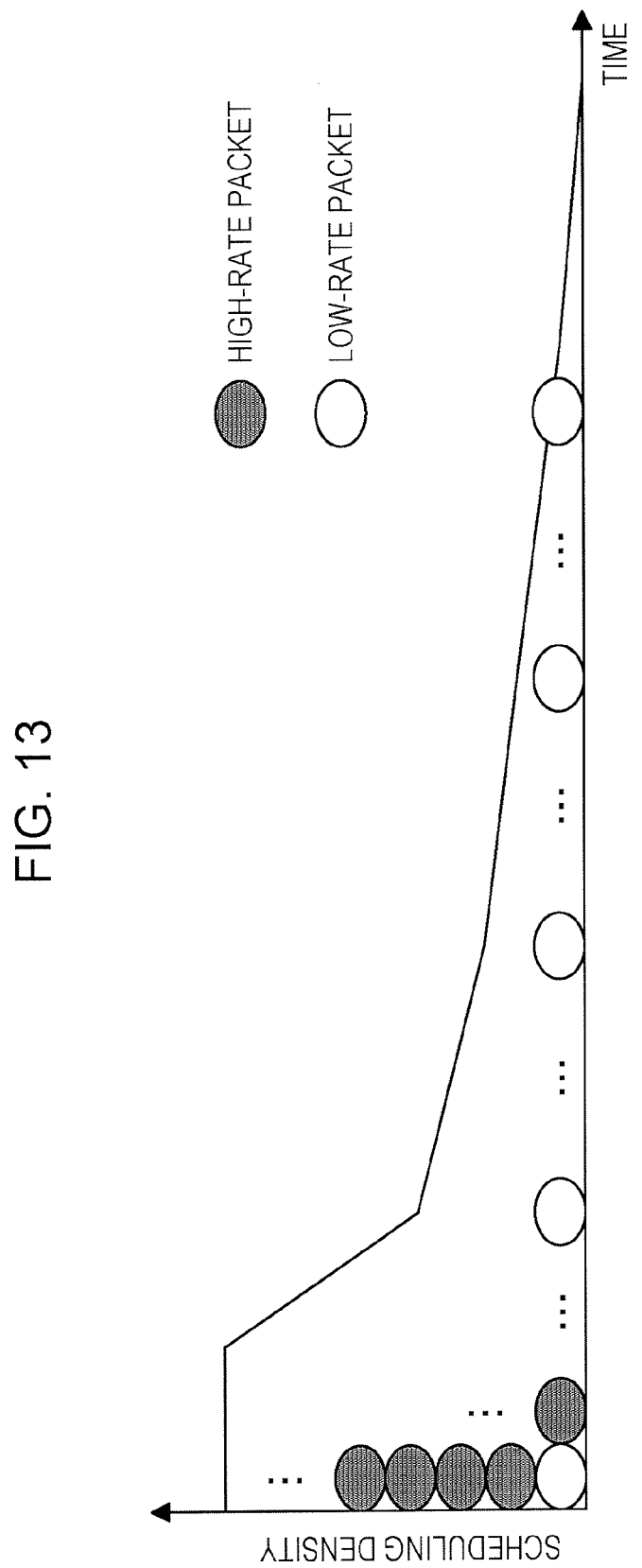

FIG. 17

| BUFFER MANAGEMENT TABLE | | | | |
|---|---|---|---|---|
| TR | UPPER LIMIT VALUE | CURRENT QUEUE LENGTH | FLAG CURRENTLY BEING READ | TR TYPE |
| TR1 | 90 k | 87 k | true | 0.1 ms |
| TR2 | 90 k | 42 k | false | 0.1 ms |
| ... | ... | ... | ... | ... |
| TR50 | 90 k | 41 k | false | 0.1 ms |
| TR51 | 40 k | 30 k | false | 0.1 ms |
| TR52 | 40 k | 25 k | false | 0.1 ms |
| ... | ... | ... | ... | ... |
| TR100 | 40 k | 0 | false | 0.1 ms |
| TR101 | 100 k | 66 k | true | 1 ms |
| TR102 | 100 k | 40 k | false | 1 ms |
| ... | ... | ... | ... | ... |
| TR135 | 100 k | 0 | false | 1 ms |

| | FLOW INFORMATION TABLE | | | | 123a |
|---|---|---|---|---|---|
| FLOW NUMBER | AMOUNT OF DATA PER SHORT TR BUFFER | AMOUNT OF DATA PER LONG TR BUFFER | PERMISSIBLE DELAY (N) | TR (TBx) | REMAINING CAPACITY |
| 1 | 50 k | 100 k | 3 TRs | TR3 | 40 k |
| 2 | 10 k | 100 k | 5 TRs | TR10 | 20 k |
| 3 | 1 k | 10 k | 8 TRs | TR105 | 0.5 k |
| ... | ... | ... | ... | ... | ... |

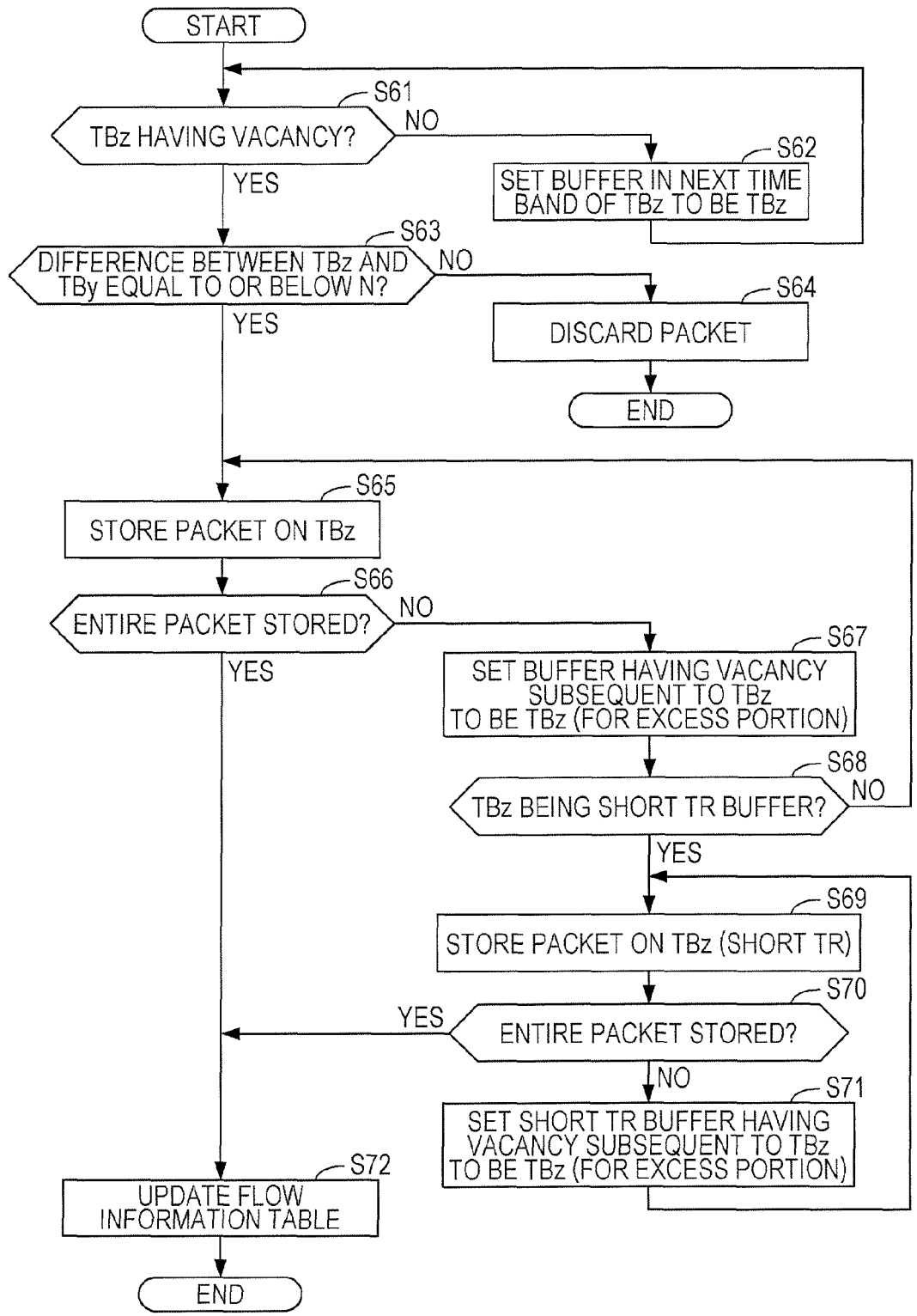

FIG. 25

| FLOW INFORMATION TABLE | | | | | |
|---|---|---|---|---|---|
| FLOW NUMBER | AMOUNT OF DATA PER BUFFER | PERMISSIBLE DELAY (N) | TR (TBx) | REMAINING CAPACITY | TR TYPE |
| 1 | 50 k | 30 TRs | TR3 | 40 k | 0.1 ms |
| 2 | 10 k | 50 TRs | TR10 | 5 k | 0.1 ms |
| 3 | 1 k | 8 TRs | TR20 | 0.5 k | 1 ms |
| ... | ... | ... | ... | ... | ... |

123b

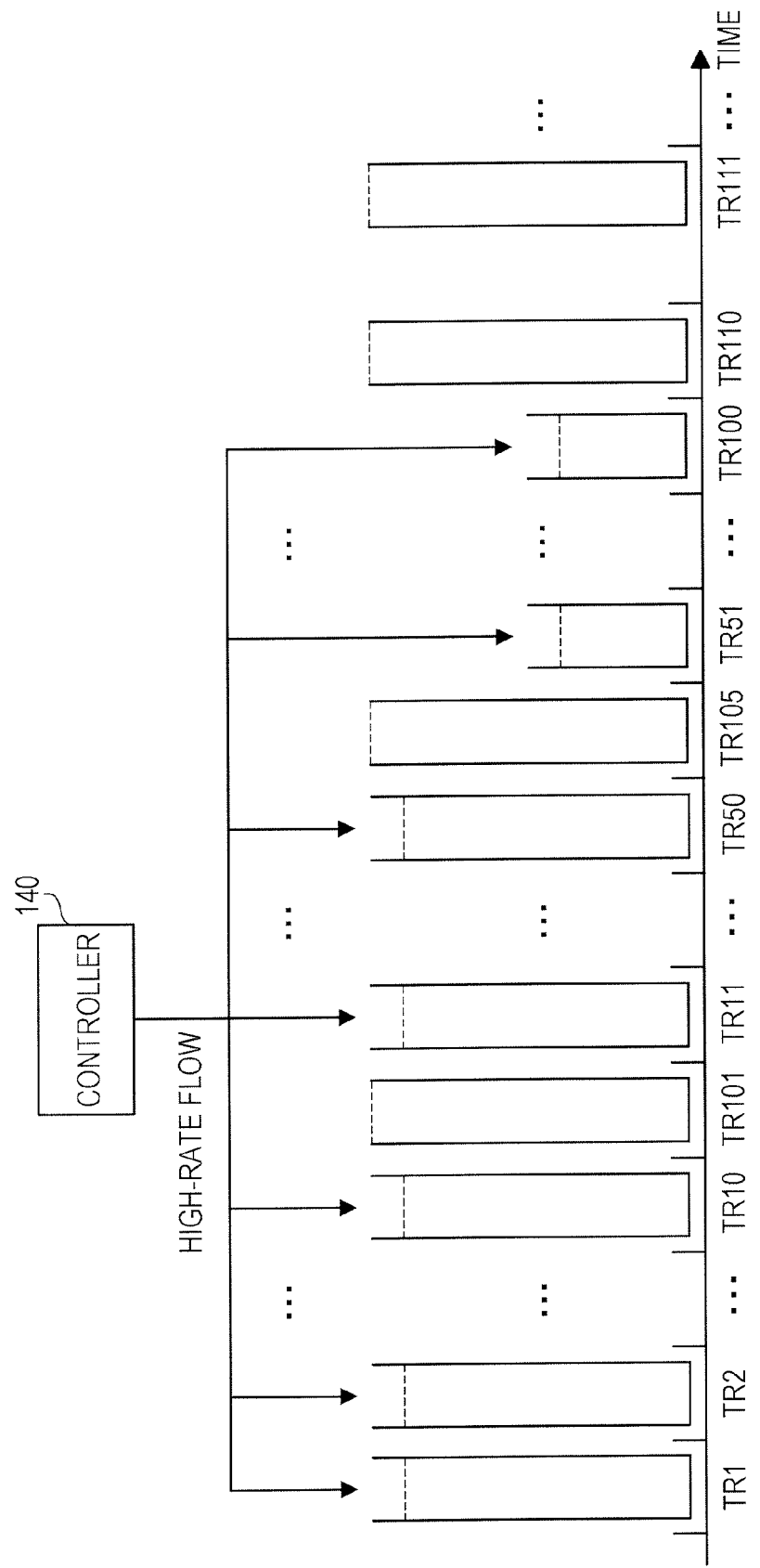

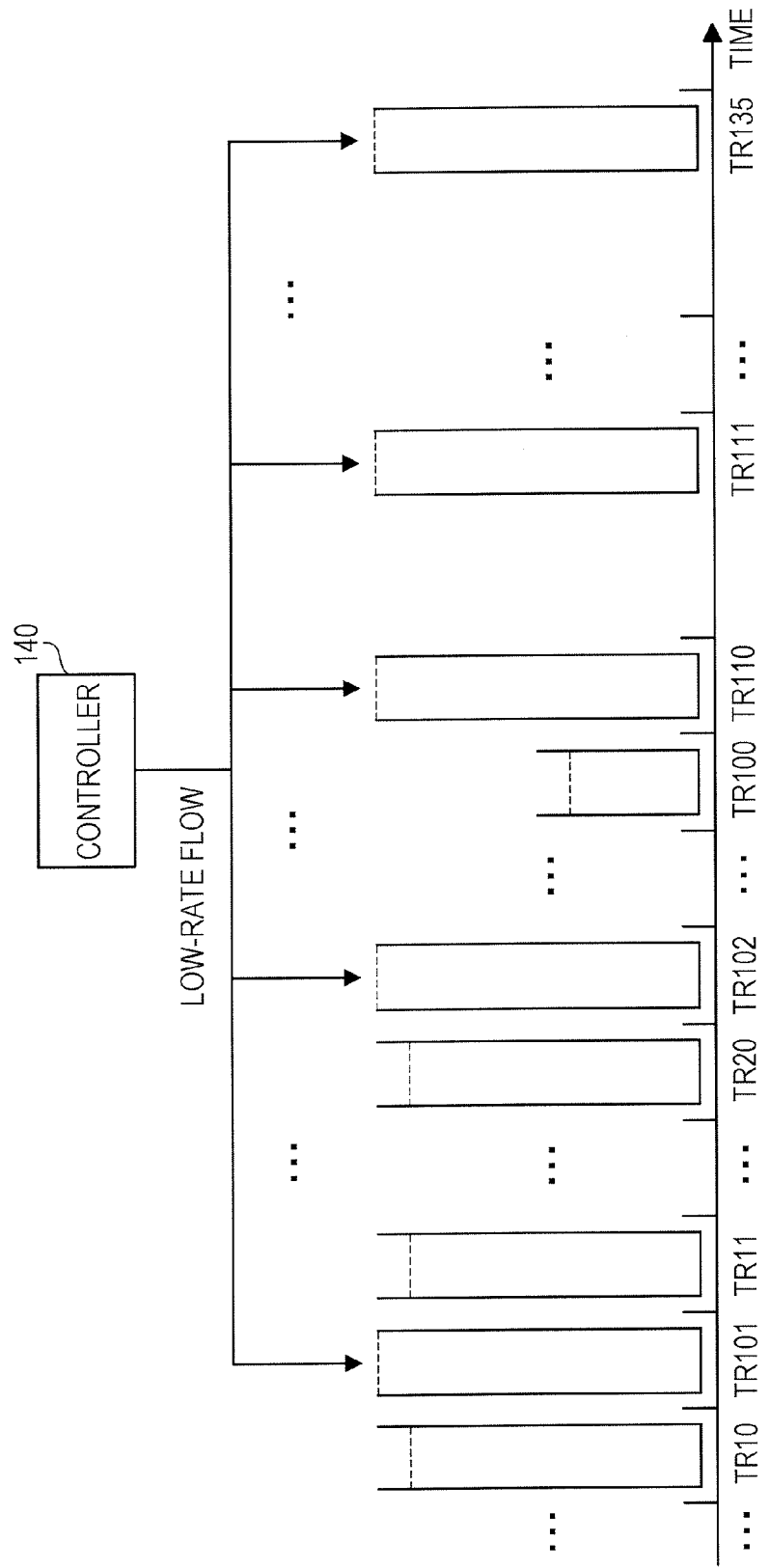

FIG. 30

| | BUFFER MANAGEMENT TABLE | | | |
|---|---|---|---|---|
| TR | UPPER LIMIT VALUE | CURRENT QUEUE LENGTH | FLAG CURRENTLY BEING READ | TR TYPE |
| TR1 | 90 k | 87 k | true | 0.1 ms |
| TR2 | 90 k | 42 k | false | 0.1 ms |
| ... | ... | ... | ... | ... |
| TR50 | 90 k | 41 k | false | 0.1 ms |
| TR51 | 100 k | 66 k | true | 1 ms |
| TR52 | 100 k | 40 k | false | 1 ms |
| ... | ... | ... | ... | ... |
| TR100 | 100 k | 0 | false | 1 ms |

| BAND MANAGEMENT TABLE | | | | 124 |
|---|---|---|---|---|
| RATE DESIGNATE | RATE UPPER LIMIT VALUE | USER COUNT COUNTER | CUMULATIVE BAND COUNTER | |
| 1 | 500 Mbps | 3 | 912 Mbps | |
| 2 | 100 Mbps | 21 | 482 Mbps | |
| 3 | 10 Mbps | 62 | 85.5 Mbps | |

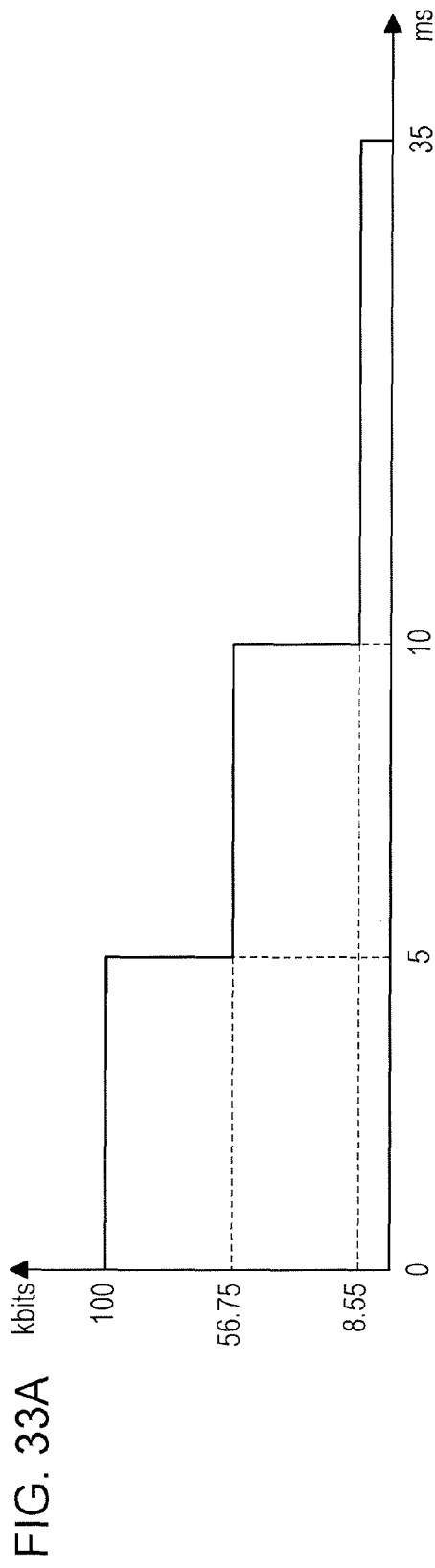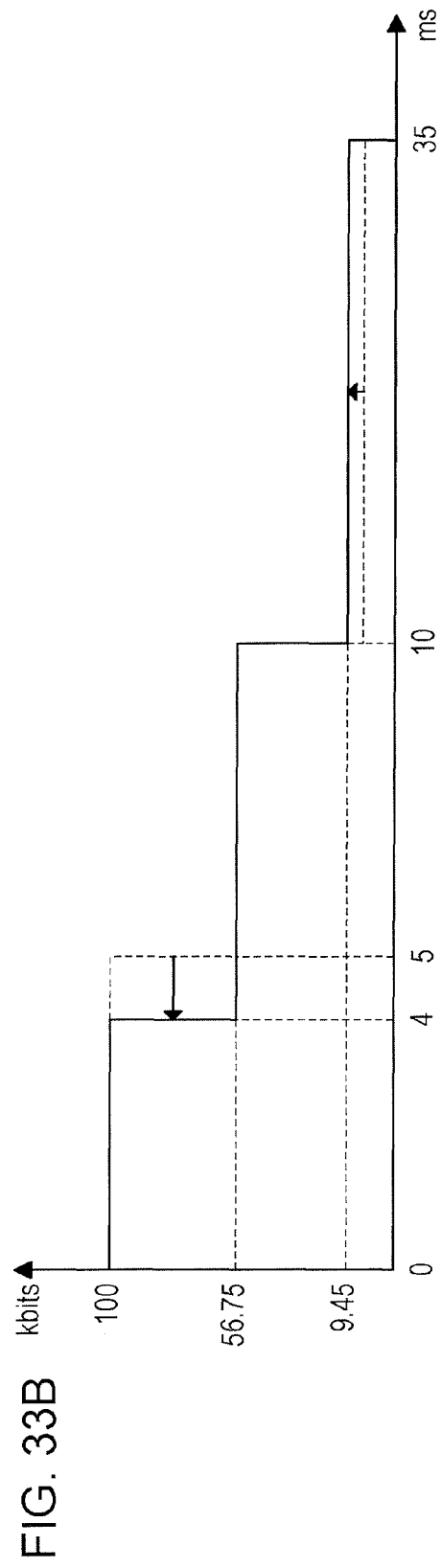

RELAY APPARATUS AND BUFFER CONTROL METHOD

CROSS-REFERENCE TO RELATED APPLICATION

This application is based upon and claims the benefit of priority of the prior Japanese Patent Application No. 2012-280052, filed on Dec. 21, 2012, the entire contents of which are incorporated herein by reference.

FIELD

The embodiments discussed herein are related to a relay apparatus and a method for controlling a buffer.

BACKGROUND

A variety of apparatuses are linked to each other via a network. The network includes at least one relay apparatus. The relay apparatus transfers received data to a destination apparatus. The network is used for communications of various users and services. The relay apparatus identifies each piece of traffic occurring in communications of users and services by a unit called a flow in accordance with a specific identifier attached to the data.

Multiple flows occur over the network, and there is a limitation on a band of a line of the network. If an amount of flowing data exceeds the band of the line, resulting congestion may delay communications. The relay apparatus may thus perform quality of service (QoS) such as policing or shaping.

Policing is a technique of discarding data in excess if a transfer rate of data exceeds an upper rate. Shaping is a technique of storing data in excess onto a buffer if a transfer rate of data exceeds an upper rate, and then outputting the data in excess after a specific period of time has elapsed. Using these techniques, the transfer rate of the data is guaranteed on a per flow basis.

In the shaping, scheduling is performed in order to output the data stored on the buffer later. For example, in one disclosed technique, an input packet is stored on a buffer, and then the output end time of the input packet is calculated beforehand in accordance with the length of the input packet on each flow, and a packet output interval defining a preceding packet output end time and a desired transmission rate. By outputting the input packet at the calculated output end time from the buffer, even a variable length packet may be output at a desired transmission rate on a per flow basis.

In another disclosed technique, a unit to discard data rather than storing the data onto a buffer is used on a per connection basis. Multiple connections are stored on the same buffer while a minimum band is ensured for each connection.

As described above, the shaping employs a buffer to temporarily store data exceeding a limitation rate. For example, it is contemplated that multiple buffers that may store data of multiple flows are arranged and that scheduled data is then distributed among the buffers. The buffer as a target to be read is successively switched at specific time intervals, and data stored on the buffers is then successively output. An amount of data that may be stored on a single buffer on a per flow basis is limited by the transfer rate of each flow. More specifically, it is contemplated that a relatively larger amount of data is permitted to be stored in a flow having a relatively higher transfer rate, and that a relatively smaller amount of data is permitted to be stored in a flow having a relatively lower transfer rate.

A buffer capacity of a flow having a relatively low transfer rate is smaller than a buffer capacity of a flow having a relatively higher transfer rate. If a buffer capacity is insufficient to perform scheduling, data will be discarded. On the other hand, a memory size of multiple buffers is limited. Given a limited memory size, the challenge is to increase a buffer capacity of a flow having a relatively low transfer rate.

The techniques described above are disclosed in Japanese Laid-open Patent Publication Nos. 2006-197235 and 11-112527.

SUMMARY

According to an aspect of the embodiments, a relay apparatus that transfers data with an identifier corresponding to a transfer rate attached thereto and stores data as a transfer target to adjust the transfer rate, the relay apparatus includes multiple buffers that are respectively associated with multiple time regions that serve as targets to be successively read from a current point of time onward, each buffer having a capacity to store an amount of data determined in accordance with the transfer rate of the identifier, and a controller that reduces a size of a buffer corresponding to a second time region to be smaller than a size of a buffer corresponding to a first time region prior to the second time region in accordance with a time difference between the current point of time and the second time region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 illustrates an example of a buffer management table of the second embodiment;

FIG. 9 is a flowchart illustrating an example of buffering of the second embodiment;

FIG. 11 is a flowchart illustrating an example of a buffer redistribution of the second embodiment;

FIG. 13 illustrates an example of scheduling;

FIG. 17 illustrates a buffer management table of the third embodiment;

FIG. 18 illustrates an example of a flow information table of the third embodiment;

FIG. 20 is a flowchart illustrating a process example of a long time region (TR) base of the third embodiment;

FIG. 25 illustrates a flow information table of a fourth embodiment;

FIG. 27 illustrates scheduling of a high rate flow of the fourth embodiment;

FIG. 28 illustrates scheduling of a low rate flow of the fourth embodiment;

FIG. 30 illustrates an example of a buffer management table of the fifth embodiment;

FIG. 31 illustrates an example of a band management table of a sixth embodiment;

FIG. 33A and FIG. 33B illustrate an example of the buffer capacity updating of the sixth embodiment.

DESCRIPTION OF EMBODIMENTS

Embodiments are described below with reference to the drawings.

First Embodiment

Figure 1:
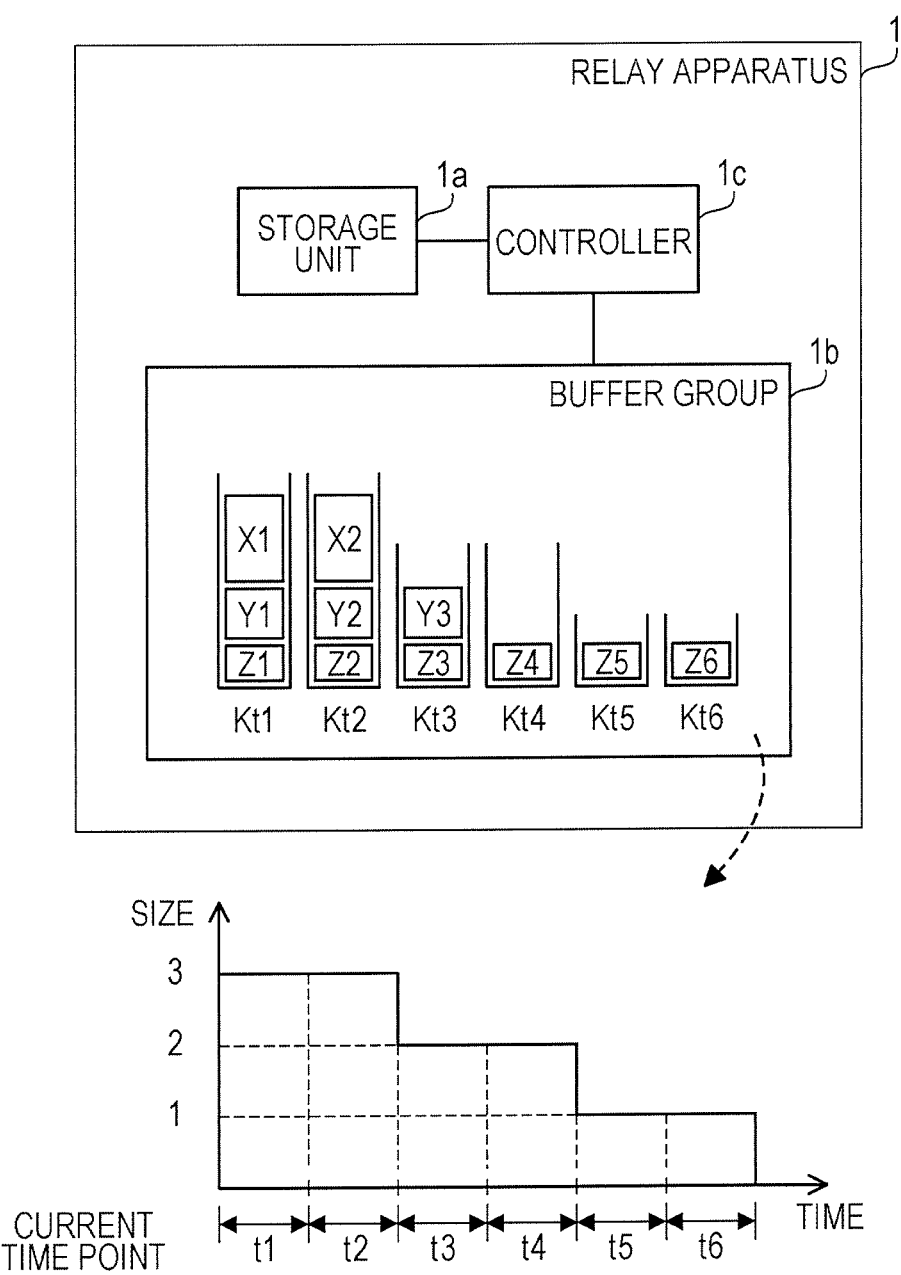
FIG. 1 illustrates a relay apparatus of a first embodiment.

FIG. 1 illustrates a relay apparatus 1 of a first embodiment. The relay apparatus 1 is used to transfer data with an identifier attached thereto. The identifier is information that identifies a flow. For example, through a contract, a transfer rate that is guaranteed on a per identifier (flow) basis is determined in advance. Information indicating a correspondence relationship between the identification and the guaranteed transfer rate is provided to the relay apparatus 1. The identifier may attached to data for use in a process performed in the relay apparatus 1. An identifier does not have to be attached to data transmitted from the relay apparatus 1.

The relay apparatus 1 may store data as a transfer target to adjust the transfer rate. This function may also be referred to as shaping. The relay apparatus 1 includes a storage unit 1$a$, a buffer group 1$b$ and a controller 1$c$.

The storage unit 1$a$ stores information to manage multiple buffers included in the buffer group 1$b$. The information stored on the storage unit 1$a$ contains information that indicates an association relationship between the multiple buffers and multiple time regions serving as targets to be successively read from the current point of time onward. The information stored on the storage unit 1$a$ also contains information that indicates an amount of data per flow that may be stored on a single buffer. These pieces of information may be generated by the controller 1$c$ and then stored on the storage unit 1$a$.

The amount of data per flow that may be stored on a single buffer is determined in accordance with a transfer rate of each flow. A flow having a relatively higher transfer rate (hereinafter also referred to as a high rate flow) permits a larger amount of data to be stored than a flow having a relatively lower transfer rate (hereinafter also referred to as a low rate flow). This is intended to ensure the transfer rate in each flow guaranteed by a contract or the like.

The buffer group 1$b$ is a set of multiple buffers. A buffer may be a single queue. The buffer group 1$b$ includes buffers Kt1, Kt2, Kt3, Kt4, Kt5, and Kt6. Each of the buffers Kt1, Kt2, Kt3, Kt4, Kt5, and Kt6 stores multiple flows.

The buffers Kt1, Kt2, Kt3, Kt4, Kt5, and Kt6 are respectively associated with time regions t1, t2, t3, t4, t5, and t6 that serve as targets to be successively read from the current point of time onward as described above. The time regions t1, t2, t3, t4, t5, and t6 consecutively appear in that order. For example, the time region t1 is followed by the time region t2, and the time region t2 is followed by the time region t3. The time region t1 is closest to the current point of time or may include the current point of time.

Each buffer may be read in its associated time region with reference to the current point of time. More specifically, the buffer Kt1 is read in the time region t1. The buffer Kt2 is read in the time region t2. The buffer Kt3 is read in the time region t3. The buffer Kt4 is read in the time region t4. The buffer Kt5 is read in the time region t5. The buffer Kt6 is read in the time region t6.

The controller 1$c$ references the information stored on the storage unit 1$a$, and in response to a time difference between the current point of time and a second time region, reduces the size of the buffer corresponding to the second time region to be smaller than the size of the buffer corresponding to a first time region prior to the second time region. In other words, as the time difference between the current point of time and a time region is longer, the controller 1$c$ relatively reduces the size of the buffer corresponding to the time region to be smaller.

For example, the controller 1$c$ may determine the time difference between the current point of time and each time region by determining a difference between the current point of time and any point of time within the time region (for example, the start point of the time region, the median point of the time region, or the end point of the time region).

If the time differences from the current point of time are arranged in the order from small to large, the time regions t1, t2, t3, t4, t5, and t6 appear in that order. The time region t1 has the relatively smallest time difference. The time region t6 has the relatively largest time difference. The controller 1$c$ thus maximizes the size of the buffer Kt1 and minimizes the size of the buffer Kt6. The controller 1$c$ may control the sizes of the buffers so that the sizes of the buffers become successively stepwise smaller.

If the time difference between the current point of time and a given time region exceeds a threshold value, the controller is sets the size of the buffer at the given time region to be smaller than the size of the buffer prior to the given time region. More specifically, the controller 1$c$ sets the sizes of the buffers Kt1 and Kt2 to be equal to each other. The time difference between the current point of time and each of the time regions t3 and t4 is equal to or above a first threshold value. The controller is thus sets the sizes of the buffers Kt3 and Kt4 to be smaller than the size of the buffers Kt1 and Kt2 by one notch. The time difference between the current point of time and each of the time regions t5 and t6 is equal to or above a second threshold value. The second threshold value is higher than the first threshold value. The sizes of the buffers Kt5 and Kt6 are set to be smaller than the sizes of the Kt3 and Kt4 by one notch.

The controller 1c in the relay apparatus 1 performs a control operation in response to a time difference between the current point of time and a second time region so that a size of the buffer corresponding to the second time region is smaller than a size of the buffer corresponding to a first time region prior to the second time region.

It is contemplated that the buffers have the same size. In such a case, however, allocation of memory areas is likely to become inefficient. This is discussed below.

Data of a high rate flow is stored more on a single buffer. Even if traffic concentrates at a given point of time, more data may be scheduled using buffers close to the current point of time, for example, by storing four packets on an immediately close buffer, and one packet on a next buffer. On the other hand, a packet of a low rate flow is smaller in amount of data stored on a buffer than a high rate flow. Data may be stored on only discrete future buffers (for example, data is stored on multiple buffers, such as on first, sixth, and eleventh buffers from the current point of time). In accordance with such scheduling characteristics, it is likely that an amount of data stored on a buffer of a more future is smaller than an amount of data stored on a buffer close to the current point of time. The buffer of a more future is likely to have a redundant capacity. For this reason, setting the buffers to be equal to each other in size is inefficient.

As the time difference between the current point of time and the time region is larger, the relay apparatus 1 reduces the buffer corresponding to the time region to be relatively smaller in size. Given the limited memory size, the buffer capacity of the low rate flow is efficiently provided. By reducing the size of the buffer of a more future, a memory area, which has a low possibility of being used if the buffers are set to be of the same size, is allocated to a buffer of a more future. More specifically, time axis available for scheduling is extended.

For example, if the sizes of the buffers may be equalized to 3 with a memory size usable in the buffer group 1b being 12, a range extending along a time axis is time regions t1 through t4. As described above, the buffers may have redundant capacity at the time regions t3 and t4. For example, the buffers Kt1 and Kt2 are set to be a size of 3, the buffers Kt3 and Kt4 are set to be a size of 2, and the buffers Kt5 and Kt6 are set to be a size of 1. Coverage over to the time region t6 is thus possible.

For example, the buffer Kt1 stores data X1 of a flow having a first transfer rate (referred to as a flow X), data Y1 of a flow having a transfer rate lower than the flow X (referred to as a flow Y), and data Z1 of a flow Z having a transfer rate lower than the flow Y. The flow X has a maximum amount of data stored on a single buffer. The flow Y has an amount of data stored on the single buffer smaller than the flow X. The flow Z has an amount of data stored on a single buffer smaller than the flow Y.

The buffer Kt2 stores data X2 of the flow X, data Y2 of the flow Y, and data Z2 of the flow Z. The buffer Kt3 stores data Y3 of the flow Y and data Z3 of flow Z. The buffer Kt4 stores data Z4 of the flow Z. The buffer Kt5 stores data Z5 of the flow Z. The buffer Kt6 stores data Z6 of the flow Z. If all the buffers are set to be of the same size, the scheduling covers only to the time region t4 along the time axis. The data Z5 and Z6 are not scheduled but discarded. If the scheduling is performed down to the buffer Kt6, the possibility that a flow of a low rate that may be stored on a buffer of a more future is not scheduled but discarded is reduced.

Irregular traffic may concentrate in a given flow for a short period of time. Such a phenomenon may sometimes be called a burst. A high probability that irregular traffic concentrates for a short period of time is referred to as a high burstiness. To cope with a high burstiness flow, reserving a relatively large buffer capacity may be desired. In accordance with the first embodiment, a relatively large buffer capacity may be ensured for a low rate flow. Even a low rate flow increases the possibility that data is stored in response to a burst. More specifically, a burst resistance of a low rate flow is increased.

Second Embodiment

Figure 2:
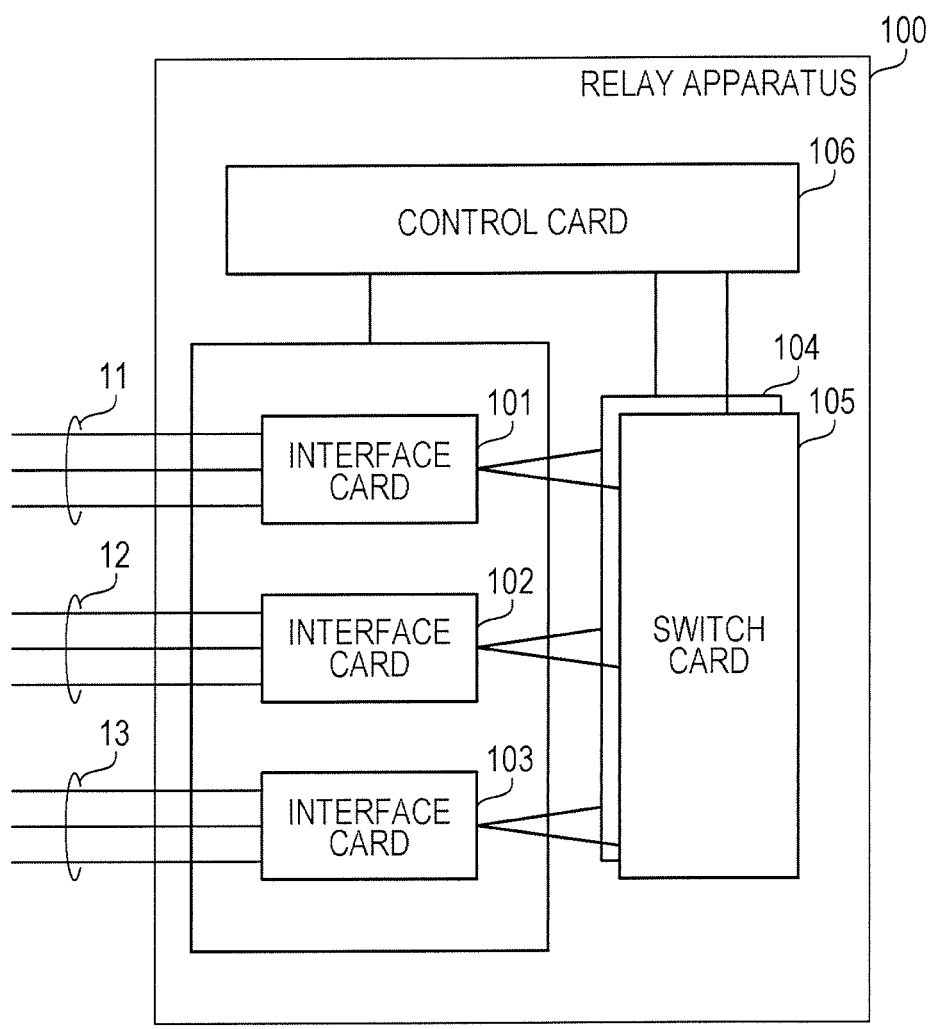
FIG. 2 illustrates a hardware configuration of a relay apparatus of a second embodiment.

FIG. 2 illustrates a hardware configuration of a relay apparatus 100 of a second embodiment. The relay apparatus 100 relays communications between various apparatuses (including a computer and a mobile terminal apparatus). The relay apparatus 100 is a switch apparatus or a router apparatus, for example. The relay apparatus 100 includes interface cards 101, 102, and 103, and switch cards 104, and 105, and a control card 106.

The interface cards 101, 102, and 103 include respective interfaces to input and output data to the relay apparatus 100. The interface is directly connected to a physical link (an optical fiber, here). The interface is a small form factor pluggable (SFP), for example. Alternatively, the interface may be connected to a physical link of another type, such as a copper cable.

The switch cards 104 and 105 input and output data between the interface cards 101, 102, and 103.

The control card 106 inputs and outputs control information to the interface cards 101, 102, and 103 and the switch cards 104 and 105. The control card 106 manages operational states of the interface cards 101, 102, and 103 and the switch cards 104 and 105.

Figure 3:
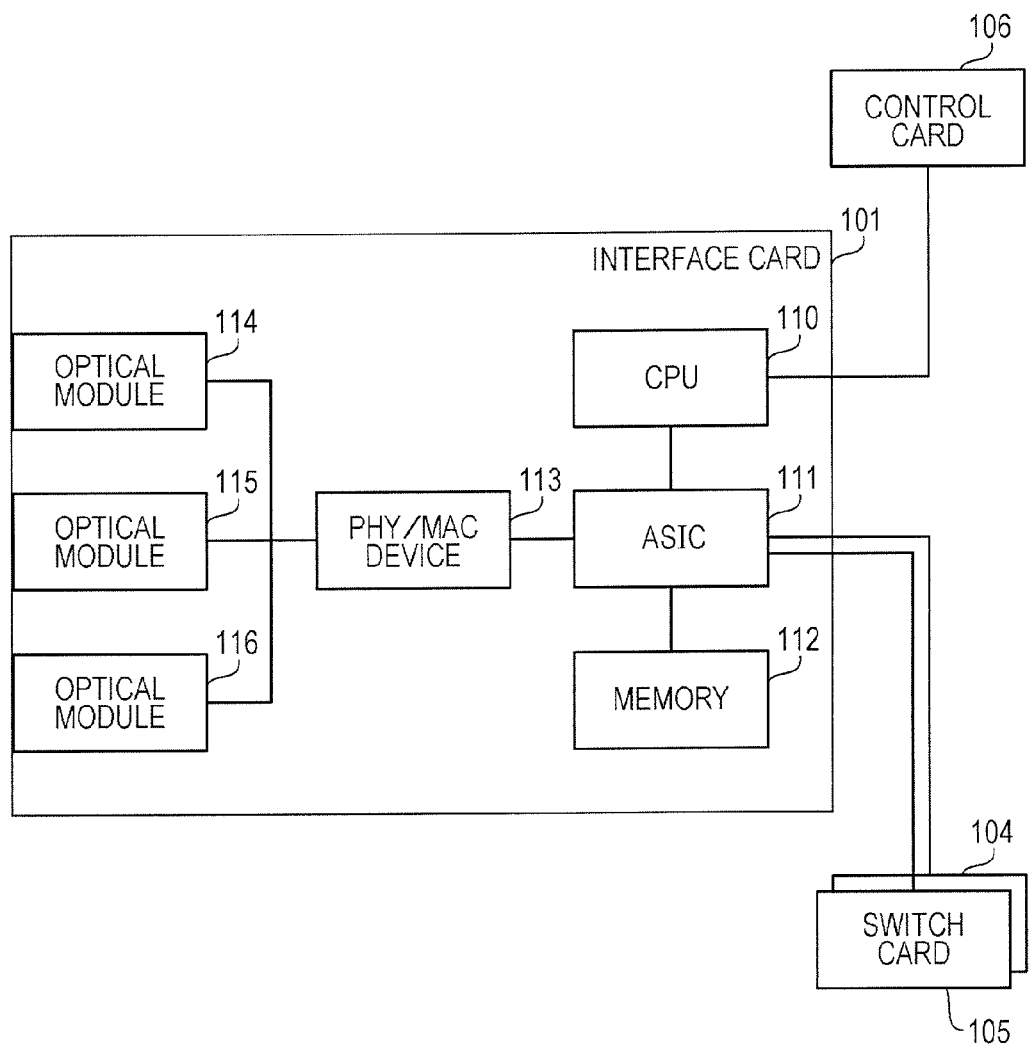
FIG. 3 illustrates an interface card of the second embodiment.

FIG. 3 illustrates an interface card 101 of the second embodiment. The interface card 101 includes a central processing unit (CPU) 110, an application specific integrated circuit (ASIC) 111, a memory 112, a physical (PHY)/media access control (MAC) device 113, and optical modules 114, 115, and 116. The interface cards 102 and 103 are implemented using the same elements.

The CPU 110 performs a specific software process (such as collecting statistical data) by communicating with the ASIC 111, and provides a graphic user interface (GUI) on which a user enters settings for the ASIC 111.

The ASIC 111 is a processor that performs shaping on a packet input from the switch cards 104 and 105 and the PHY/MAC device 113 to adjust a transfer rate on a per flow basis. The ASIC 111 also outputs a packet to the PHY/MAC device 113. The ASIC 111 may sometimes output a packet input from the PHY/MAC device 113 to the switch cards 104 and 105. The relay apparatus 100 may be a processor of another type, such as a field programmable gate array (FPGA), in place of or in addition to the ASIC 111.

The memory 112 stores a variety of data for use in a process of the ASIC 111.

The PHY/MAC device 113 performs a PHY/MAC process on a packet input from the ASIC 111, and then outputs a resulting packet to any of the optical module 114, 115, and 116. The PHY/MAC device 113 extracts a packet from an electrical signal input from any of the optical module 114, 115, and 116, and then outputs the extracted packet to the ASIC 111.

Each of the optical modules 114, 115, and 116 converts a frame input from the PHY/MAC device 113 into an optical signal, and then outputs the optical signal over to an optical fiber. Each of the optical modules 114, 115, and 116 converts an optical signal input via the optical fiber into an electrical signal, and outputs the electrical signal to the PHY/MAC device 113.

Figure 4:
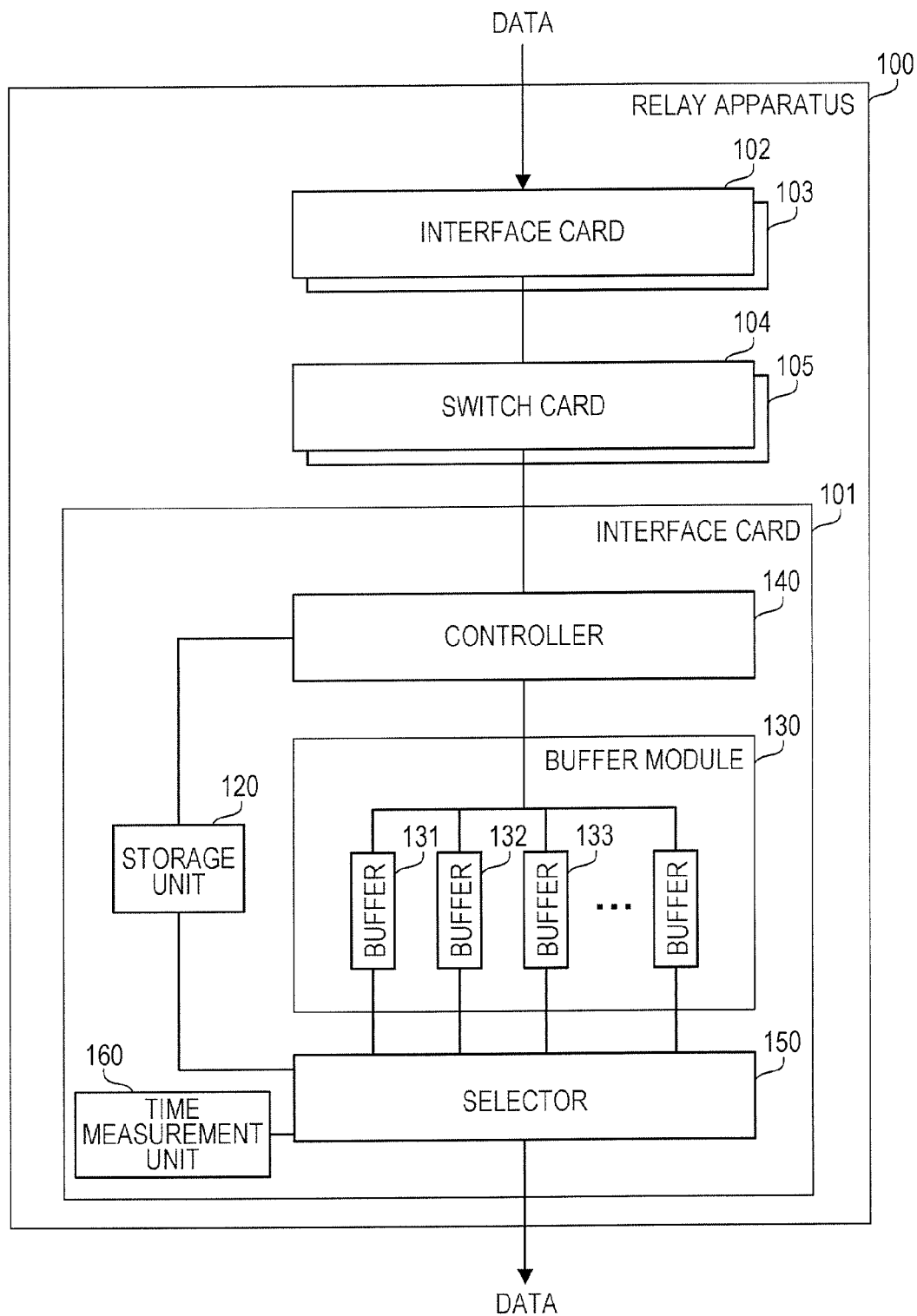
FIG. 4 illustrates (a portion of) the interface card of the second embodiment.

FIG. 4 illustrates (a portion of) the interface card 101 of the second embodiment. The interface card 101 includes a storage unit 120, a buffer module 130, a controller 140, a selector 150, and a time measurement unit 160. The storage unit 120 and the buffer module 130 may be implemented using a memory area of the memory 112. The controller 140, the selector 150, and the time measurement unit 160 may be implemented using the ASIC 111. Alternatively, the controller 140, the selector 150, and the time measurement unit 160 may be implemented using another ASIC.

The storage unit 120 stores information used to manage a buffer in the buffer module 130 and information used to manage a flow. The flow herein refers to information corresponding to a virtual local area network identifier (VLAN ID) contained in data arriving at the relay apparatus 100 and a port number in the relay apparatus 100 at the arrival of the data. The flow which is a combination of the VLAN ID and the port number, or an ID corresponding to the combination may be attached to a packet extracted by an interface card at an input side.

The buffer module 130 includes a set of buffers 131, 132, 133 . . . to buffer packets. Each buffer is a queue. Each buffer stores packets of multiple flows.

The controller 140 performs shaping by referencing information stored on the storage unit 120. More specifically, the controller 140 stores received packets on the buffers 131, 132, 133, . . . . A time band during which a packet is read from a buffer is preset. The controller 140 determines a buffer on which data is to be stored in accordance with the transfer rate of each flow (scheduling), and determines an amount of data to be stored in accordance with the transfer rate.

The method of scheduling described above is performed in a buffer storage time, and is thus called an input-type scheduling. In another scheduling method, on the other hand, a buffer to store a flow is allocated in a fixed way, and a buffer from which the data is to be output is selected during outputting. This scheduling method is called an output-type scheduling.

In response to information of the time input from the time measurement unit 160, the selector 150 reads a packet from a buffer corresponding to a time band containing the time.

The time measurement unit 160 outputs the present time to the selector 150.

Figure 5:
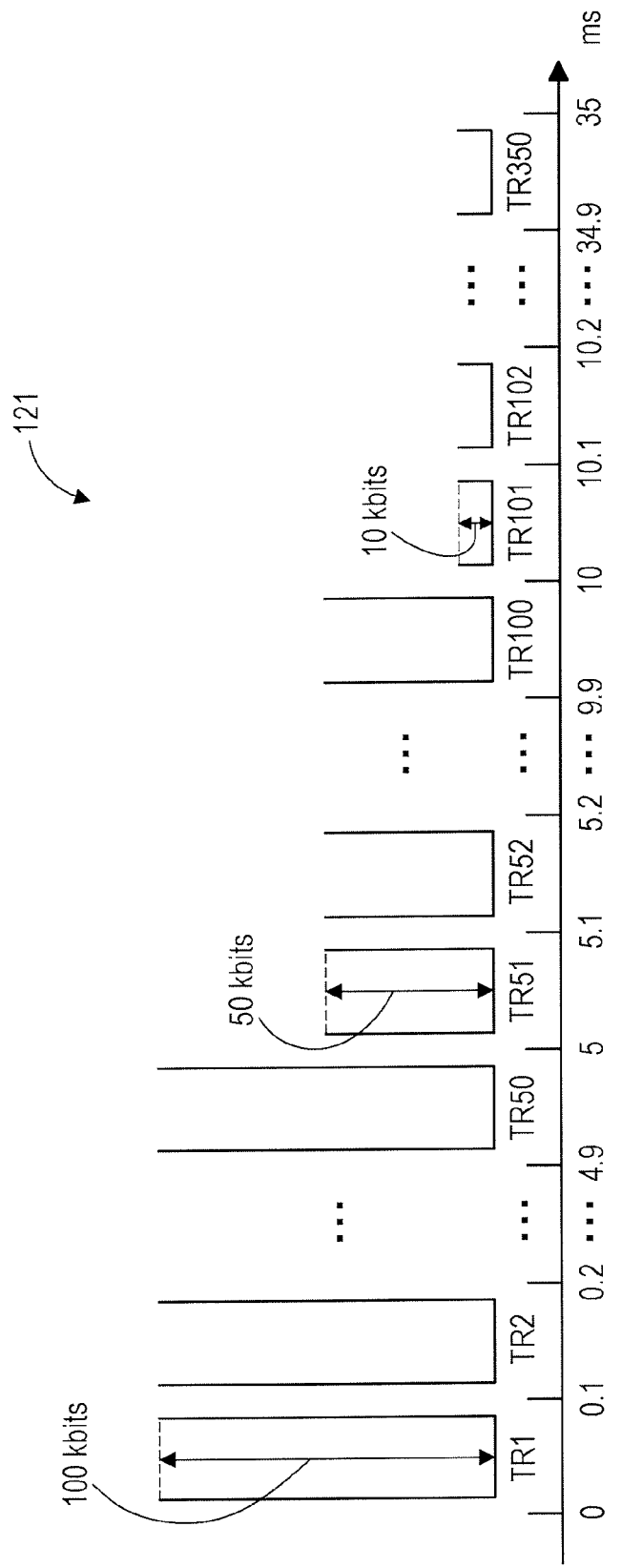
FIG. 5 illustrates an example of a time table of the second embodiment.

FIG. 5 illustrates an example of a time table 121 of the second embodiment. The time table 121 is information that determines an association relationship between each time band and a buffer serving as a target to be read. The buffer is specified by a pointer that points to an address on the memory 112. The time table 121 is stored on the storage unit 120. In the second embodiment, a duration of 35 ms from the current point of time is segmented by a time band of 0.1 ms, and the buffers are switched on one after another as a read target.

The time band from the current point of time (a time point of 0) to 0.1 ms is a time region TR1. The time table 121 associates the time region TR1 with one of the buffers of the buffer module 130 (the buffer 131, for example). The time band from 0.1 ms to 0.2 ms is a time region TR2. The time table 121 associates the time region TR2 with one of the buffers of the buffer module 130 (the buffer 132, for example). A total of 350 time regions, each having a period of 0.1 ms, are thus defined within the duration of 35 ms. In other words, time regions TR1, TR2, . . . , TR350 are present.

The size of each buffer is controlled to be smaller as the time difference between the current point of time and the corresponding time region is larger. More specifically, the sizes of the buffers of the time regions TR1 through TR50 are set to be 100 kbits. The sizes of the buffers of the time regions TR51 through TR100 are set to be 50 kbits. The sizes of the buffers of the time regions TR101 through TR350 are set to be 10 kbits. The size of each buffer is managed in accordance with a buffer management table. The total sum of buffer capacities of the buffer module 130 is 10 Mbits.

FIG. 6 illustrates an example of a buffer management table 122 of the second embodiment. The buffer management table 122 is stored on the storage unit 120. The buffer management table 122 includes items for TRs, upper limit values, current queue lengths, and flags currently being read.

Information representing the time regions corresponding to the buffers is listed at the item of TRs. The sizes of the buffers (the upper values of capacities usable by the buffers) are listed at the item of the upper values. The unit of the item of the upper values is bit. A data size used is listed at the item of the current queue length. The unit of the item of the current queue length is bit. A flag indicating whether a packet is currently being read from the buffer is listed at the item of the flag being currently read. If a packet is being read, true is listed. If not, false is listed.

The buffer management table 122 lists information including "1" as TR, "100 k" as the upper limit value, "95 k" as the current queue length, and "true" as the flag currently being read. The listed information means that the size of the buffer corresponding to the time region TR1 is 100 kbits, that a packet of 95 kbits has already been stored, and that the buffer is a target currently being read. In the second embodiment, the buffers are read one by one, and the flags of the other buffers are "false".

Figure 7:
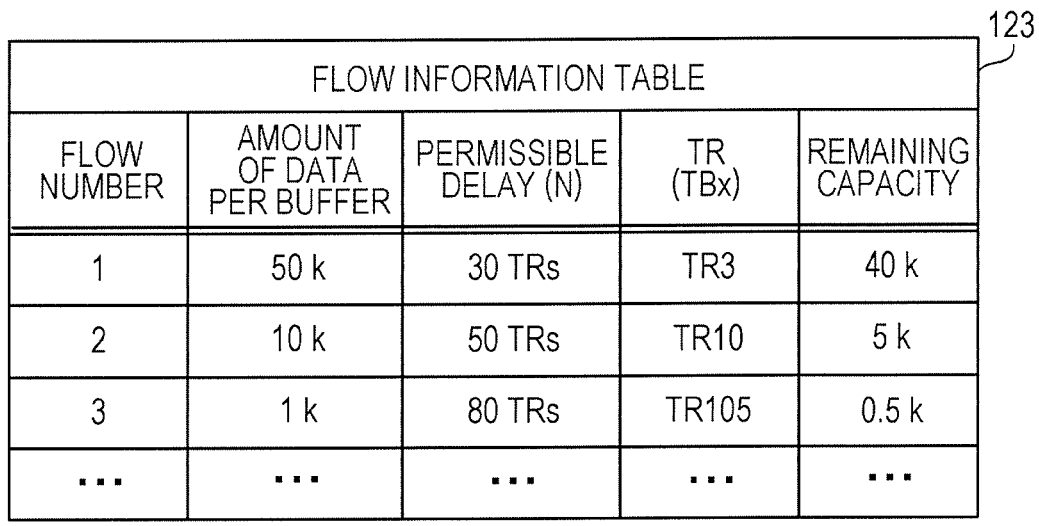
FIG. 7 illustrates an example of a flow information table of the second embodiment.

FIG. 7 illustrates an example of a flow information table 123 of the second embodiment. The flow information table 123 is stored on the storage unit 120. The flow information table 123 includes items for a flow number, an amount of data per buffer, a permissible delay, TR, and a remaining capacity.

A number identifying a flow is listed at the item of the flow number. An amount of data that may be stored on a single buffer of the flow is listed at the item of the amount data per buffer. The amount of data is determined in accordance with the transfer rate guaranteed per flow. Information indicating the number of time regions which a permissible delay corresponds to is listed at the item of the permissible delay. In the discussion that follows, the permissible delay may be denoted by N. Information indicating a time region to which a packet of the flow was scheduled last (namely, the buffer on which a packet was stored last) is listed at the item of TR. The buffer on which the packet of the flow was stored last may be denoted by TBx. If no buffering is performed in a given flow, no setting is listed at the item of TR. Information indicating an amount of data of the flow (remaining capacity) that the last buffer having stored the packet may still be able to store is listed at the item of the remaining capacity. A maximum value of the remaining capacity is equal to an amount of data per buffer.

For example, the flow information table 123 lists information including "1" as the flow number, "50 k" as the amount of data per buffer, "30TRs" as the permissible delay, "TR3" as TR, and "40 k" as the remaining capacity. The information means that the flow identified by the flow number 1 may permit a single buffer to store data of 50 kbits, and that a delay from the current point of time to 30TRs into future is permitted at scheduling. The information further means that the packet of the flow was stored last on the buffer corresponding to the time region TR3, and that the remaining amount of data that the flow may further store on the buffer is 40 kbits (more specifically, the flow has already stored 10 kbits on the buffer corresponding to TR3).

The amount of data per buffer is determined in accordance with the transfer rate guaranteed per flow. The transfer rate is decided beforehand through a contract or the like. For example, the transfer rate guaranteed for the flow number "1" is 500 Mbps. In such a case, the time band per time region is 0.1 ms, and the amount of data per buffer is 500 Mbps×0.1 ms=50 kbits. If the guaranteed transfer rate is 100 Mbps, the amount of data per buffer is 100 Mbps×0.1 ms=10 kbits. If the guaranteed transfer rate is 10 Mbps, the amount of data per buffer is 10 Mbps×0.1 ms=1 kbits. The permissible delay is also decided beforehand through a contract or the like.

Figure 8:
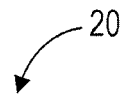
FIG. 8 illustrates an example of a packet of the second embodiment.

FIG. 8 illustrates an example of a packet 20 of the second embodiment. The packet 20 processed by the controller 140 includes fields for a flow number and a data body. A flow number to identify a flow is set in the field of the flow number. The flow number may be interpreted as an identifier to identify a flow. The flow number may be attached by an interface card at an input side having received incoming data. For example, the flow number may be a number corresponding to the combination of the VLAN ID and the port number of the port having received the packet as previously described. Alternatively, the flow number may be an Internet protocol (IP) address of a transmission source/destination, or a transmission control protocol (TCP) port number, or a combination thereof.

A data body is set in the field of the data body. When a packet is transmitted from the interface card 101 to another apparatus, the interface card 101 may remove the flow number.

FIG. 9 is a flowchart illustrating an example of buffering of the second embodiment. The buffering is described with reference to step numbers in FIG. 9.

Step S11: The controller 140 obtains a packet as a transfer target (in the following discussion, the packet may also be referred to as an incoming packet).

Step S12: The controller 140 retrieves the flow number of the packet. By referencing the time table 121 and the flow information table 123, stored on the storage unit 120, the controller 140 retrieves information indicating a buffer TBx that is currently storing the packet in accordance with the flow. The buffer TBx is represented by information indicating the time region set at the item of TR in the flow information table 123 or a pointer pointing to the buffer corresponding to the time region.

Step S13: The controller 140 determines whether the information indicating the buffer TBx is an effective value. If the information indicates an effective value, processing proceeds to step S14. If the information does not indicate an effective value, processing proceeds to step S15. The information indicating the effective value means that a packet arrived through the same flow in the past is present, and that the buffer TBx is specified through the buffering. The information not indicating the effective value means that a buffering operation has not been performed on the same flow but is to be newly performed (on a first packet), or means that the buffer TBx is earlier than the time of the buffer currently being read.

Step S14: The controller 140 sets the buffer TBx to be a buffer candidate that is to store an incoming packet (hereinafter the buffer candidate is also referred to as a buffer TBz). Processing proceeds to step S16.

Step S15: The controller 140 sets a buffer subsequent to the buffer currently being read by the selector 150 (hereinafter also referred to as a buffer TBy) to be a buffer TBz. Processing proceeds to step S16.

Step S16: The controller 140 references the buffer management table 122 and the flow information table 123, stored on the storage unit 120, to determine whether the buffer candidate TBz has a vacancy. If the buffer candidate TBz has a vacancy, processing proceeds to step S18. If the buffer candidate has no vacancy, processing proceeds to step S17. The buffer candidate TBz having a vacancy means that the current queue length of the buffer TBz has not reached the upper limit value in the buffer management table 122 and that a remaining capacity on the buffer TBz in the target flow is greater than 0 in the flow information table 123.

Step S17: The controller 140 sets the buffer of a next time band of the buffer TBz (the next time band is not necessarily immediately subsequent to the buffer TBz, and this holds true in the following discussion) to be a buffer candidate TBz. Depending on the transfer rate and the packet length, a buffer of the next time band may be a buffer corresponding to a time band jumped by one or more time bands. Processing returns to step S16.

Step S18: The controller 140 references the time table 121 and the flow information table 123 to determine whether the time difference between the buffer TBz and the buffer TBy is equal to or below the permissible delay N. If the time difference between the buffer TBz and the buffer TBy is equal to or below the permissible delay N, processing proceeds to step S20. If the time difference between the buffer TBz and the buffer TBy is larger than the permissible delay N, processing proceeds to step S19.

Step S19: The controller 140 discards the incoming packet. Processing thus ends.

Step S20: The controller 140 stores the incoming packet on the buffer TBz (if a portion of the incoming packet has already been stored, only the unstored portion is stored). The controller 140 updates the buffer management table 122. More specifically, a storage result of the packet in step S20 is reflected in the buffer management table 122. In other words, the data length of the newly stored one of the incoming packets is added to the value of the current queue length.

Step S21: The controller 140 determines whether the entire incoming packet has been stored. If the incoming packet has not completely been stored (in other words, an excess portion remains), processing proceeds to step S22. If the incoming packet has completely been stored, processing proceeds to step S23.

Step S22: The controller 140 sets a buffer having a vacancy subsequent to the buffer TBz to be a buffer TBz. Depending on the transfer rate and the packet length, a next buffer (of the next time band) may be a buffer corresponding to a time band jumped by one or more time bands. If that buffer has no vacancy, another next buffer is selected as the buffer TBz. The presence or absence of the vacancy in the buffer may be determined in the same way as in step S16.

Step S23: The controller 140 updates the flow information table 123. More specifically, the controller 140 sets the buffer TBz that stored the incoming packet (or part thereof) last to be the buffer TBx, and sets the time region of the buffer TBx at the item of TR in the flow information table 123. The controller 140 subtracts an amount of data stored last on the buffer TBx from the remaining capacity of the flow, and sets the resulting difference at the item of the remaining capacity in the flow information table 123.

Figure 10A:
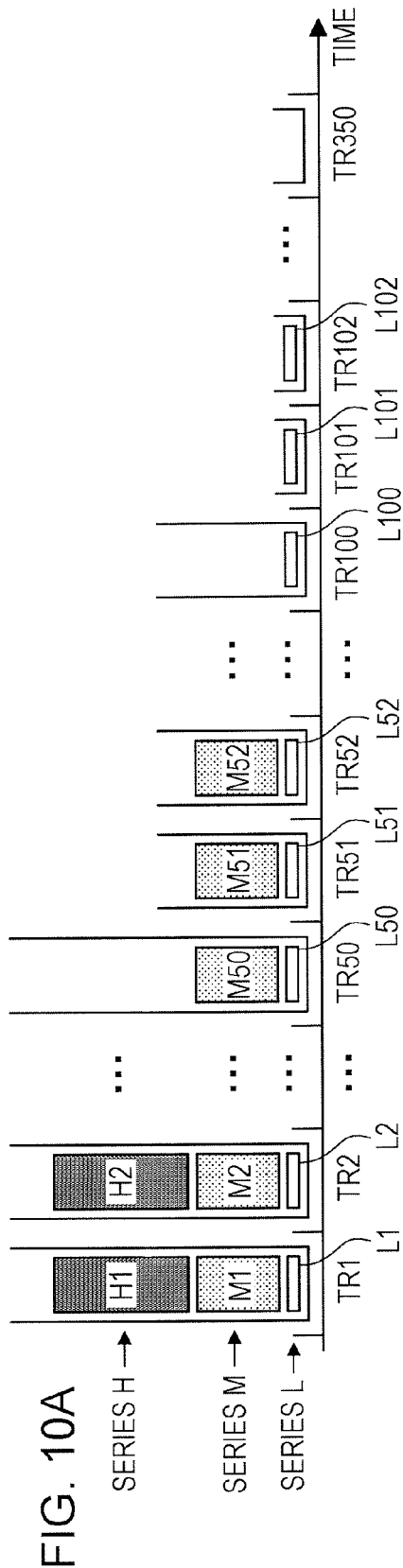
FIG. 10A and FIG. 10B illustrate a storage example of packets of the second embodiment.
Figure 10B:
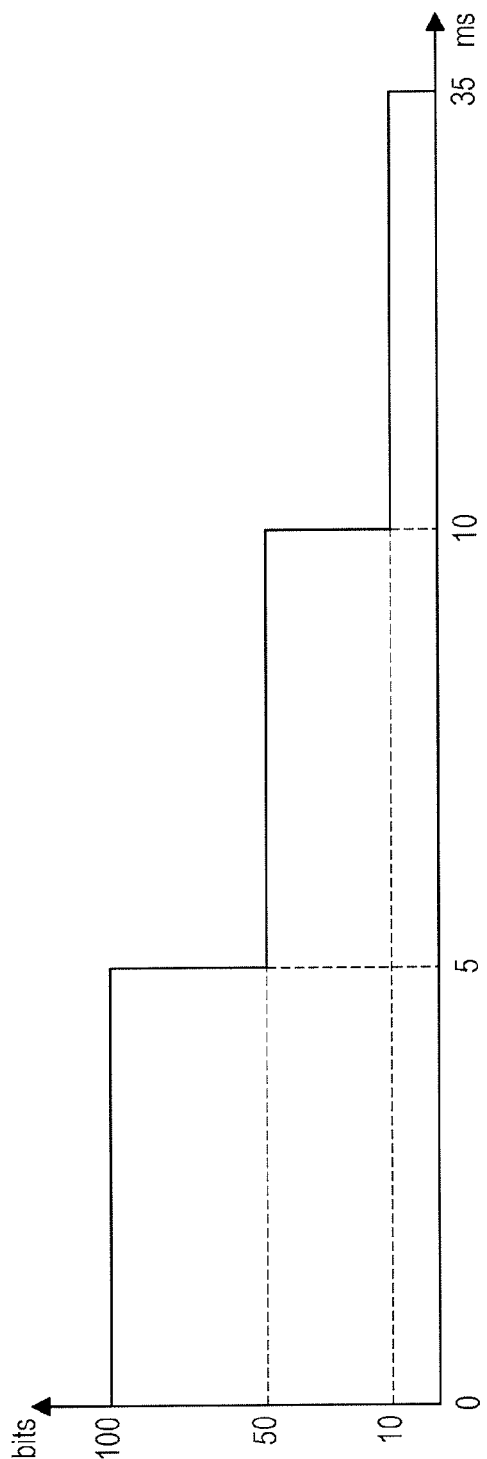

FIG. 10A and FIG. 10B illustrate a storage example of the packets of the second embodiment. FIG. 10A illustrates a storage method of the packets corresponding to flows of three types of transfer rates. Packets H1, H2, . . . in series H are buffered at the flow of a first transfer rate. Packets M1, M2, . . . , M50, M51, M52, . . . in series M are buffered at the flow of a second transfer rate lower than the first transfer rate. Packets L1, L2, . . . , L50, L51, L52, . . . , L100, L101, L102, . . . in series L are buffered at the flow of a third transfer rate lower than the second transfer rate.

In the series H, packets are not fully scheduled until a time region TR50. In the series M, packets are not fully scheduled until a time region TR100. In the series L, packets are scheduled until and after a time region TR101.

In FIG. 10B, the abscissa represents time and the ordinate represents the size of each buffer. FIG. 10B illustrates the sizes of the buffers that are reduced stepwise in response to the time difference from the current point of time (a time point at 0 on the abscissa). The sizes of the buffers set in this fashion allows scheduling to be performed until 35 ms later. The time difference between the current point of time and the time region is determined in the same way as in the first embodiment. For example, the time difference between the current point of time and the start time point of the time region may be used. If the time region increases above a threshold value, the sizes of buffers are reduced one notch at a time. More specifically, if the time difference between the current point of time and each time region is equal to or above a threshold value of 5 ms, the buffer size is reduced by one notch. Further if the time difference between the current point of time and each time region is equal to or above a threshold value of 10 ms, the buffer size is reduced by another notch. The method of controlling the buffer size in this way is described below.

FIG. 11 is a flowchart illustrating an example of a buffer redistribution of the second embodiment. The buffer redistribution is described with reference to step numbers in FIG. 11.

Step S31: The selector 150 references the time table 121 stored on the storage unit 120 to extract a packet from a buffer corresponding to the current point of time (a buffer having true as a flag currently being read in the buffer management table 122) and to transmit the packet. In this example, one buffer is read within a time band of 0.1 ms. More specifically, the reading of one buffer is complete 0.1 ms after the start of the reading. Upon completing the reading, the selector 150 modifies the flag currently being read in the buffer management table 122 of the buffer having undergone the reading from true to false. The current queue length of the buffer having undergone the reading is updated to 0. Furthermore, the flag currently being read of a next time region (for example, the time region TR2 if the reading of the time region TR1 is complete) is modified from false to true.

Step S32: The controller 140 releases the memory area of the buffer having undergone the reading.

Step S33: The controller 140 redistributes the released memory area. There is more on this later.

Step S34: The controller 140 determines whether all the packets stored on the buffers in any of the flows have been transmitted. If all the packets stored on the buffers in any of the flows have been transmitted, processing proceeds to step S35. If not all the packets stored on the buffers in any of the flows have been transmitted, processing ends. The completion of step S31 of the reading of the buffer of the time region indicated at the item of TR in any flow in the flow information table 123 means that all the packets stored on the buffer in any of the flows are transmitted.

Step S35: The controller 140 clears the item of TR in the flow information table 123 for the flow in which all the buffered packets have been transmitted. If the item of TR is cleared, a valid value of the pointer of the buffer corresponding to the item of TR in the time table 121 is difficult to obtain.

Figure 12:
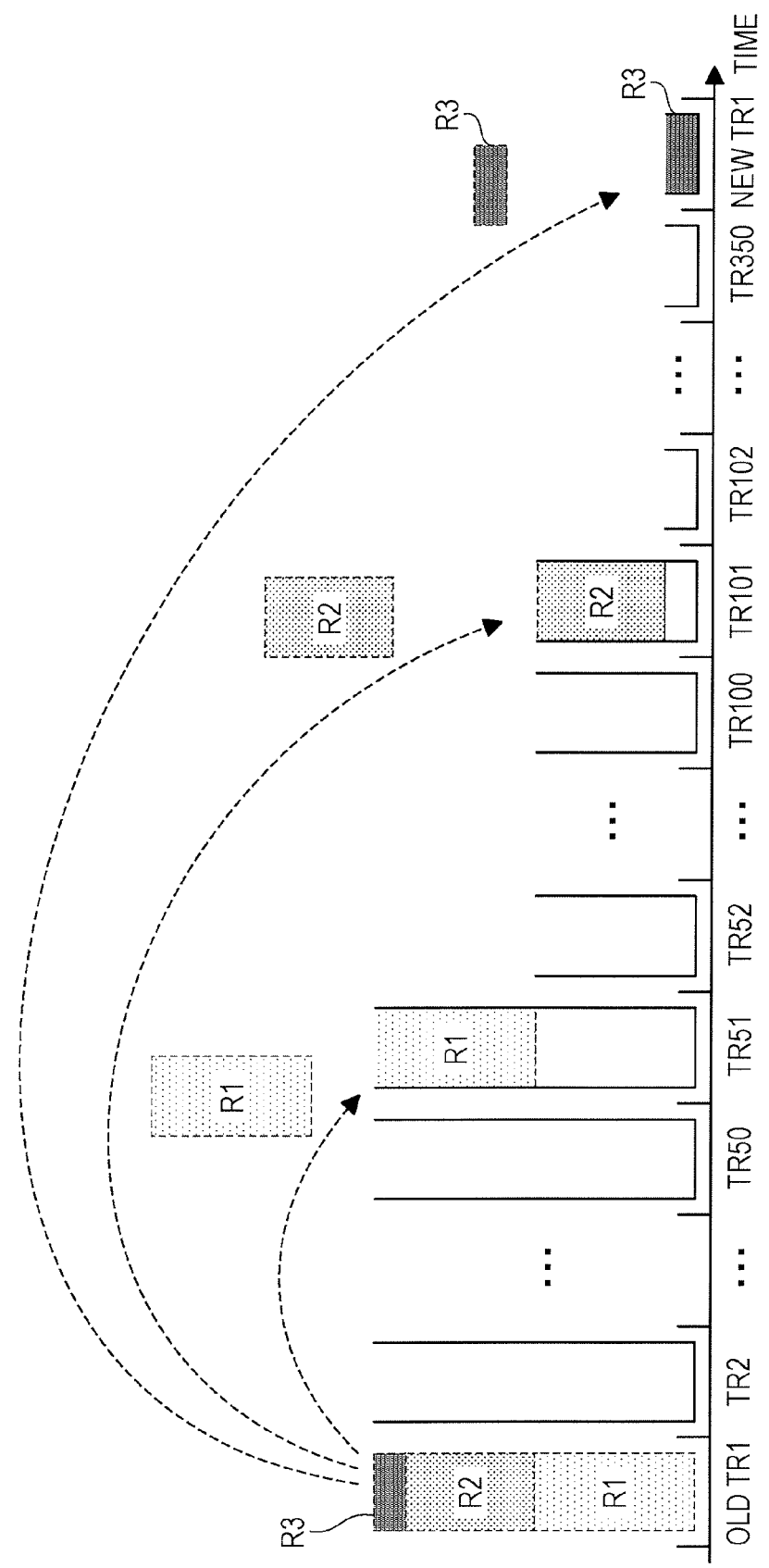
FIG. 12 illustrates an example of a buffer redistribution of the second embodiment.

FIG. 12 illustrates an example of a buffer redistribution of the second embodiment. As illustrated in FIG. 12, the reading of the buffer corresponding to the time region TR1 (denoted as an old TR1 in FIG. 12) is complete. In the time table 121, the start point of each of the time region TR2 and subsequent time regions (the time difference from the current point of time) is shifted toward the current point of time by 0.1 ms. More specifically, the time region TR2 is shifted from a time band from 0.1 through 0.2 ms to a time band 0 through 0.1 ms, and becomes a read target. The time region TR3 is shifted from a time band from 0.2 through 0.3 ms to a time band 0.1 through 0.2 ms.

The size of the buffer corresponding to the time region TR1 (old TR1) is 100 kbits. A region R1 as large as 50 kbits of the buffer is redistributed to a buffer corresponding to the time region TR51. The size of the buffer corresponding to the time region TR51 becomes 100 kbits. A region R2 as large as 40 kbits of the buffer corresponding to the time region TR1 is redistributed to a buffer corresponding to a time region TR101. The size of the buffer corresponding to the time region TR101 becomes 50 kbits. A region R3 as large as 10 kbits of the buffer corresponding to the time region TR1 is redistributed to a new time region TR1 (denoted as a new TR1 in FIG. 12). The buffer corresponding to the new time region TR1 has 10 kbits. The new time region TR1 is allocated to a time band of 34.9 to 35 ms from the current point of time. In this way, the sizes of the buffers illustrated in FIG. 10B are maintained.

FIG. 13 illustrates an example of scheduling. In practice, packets are densely scheduled in one region and coarsely scheduled in another region along the time axis. More specifically, there are many cases that packets are densely scheduled near the current point of time, and then more coarsely scheduled into the future along the time axis. It is considered that many of the packets scheduled near the current point of time are typically in a high rate flow, and that many of the packets scheduled in the future are typically in a low rate flow.

Five packets in a high rate flow and five packets in a low rate flow may now arrive. More packets in a high rate flow may be scheduled in a single region (TR). More packets are scheduled in the vicinity of the current point of time, for example, four packets scheduled in the time region TR1 and one packet in the time region TR2. On the other hand, there are times when a single packet, if in a low rate flow, is scheduled over multiple time regions (TRs). In such a case, one packet is scheduled in each of the future time bands such as the time regions TR1, TR6, TR11, TR16, and TR21.

In this way, it is likely that many of the high rate flow packets are scheduled close to the current point of time and that many of the low rate flow packets are coarsely in the future time bands.

Figure 14A:
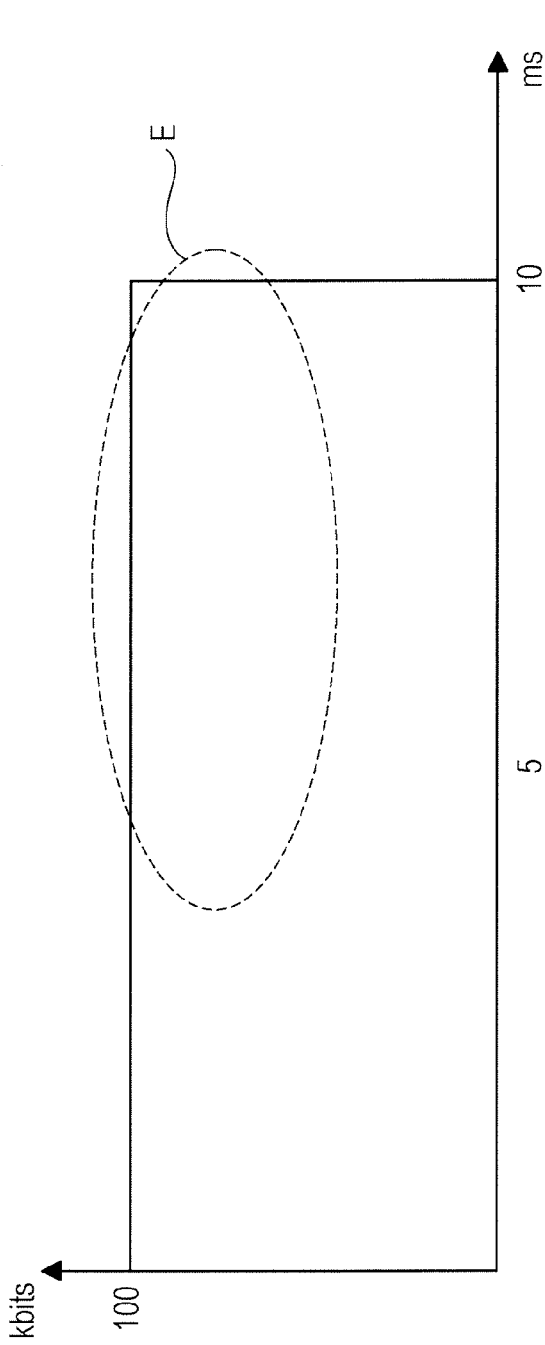
FIG. 14A and FIG. 14B illustrate a comparative example of the sizes of the buffers.
Figure 14B:
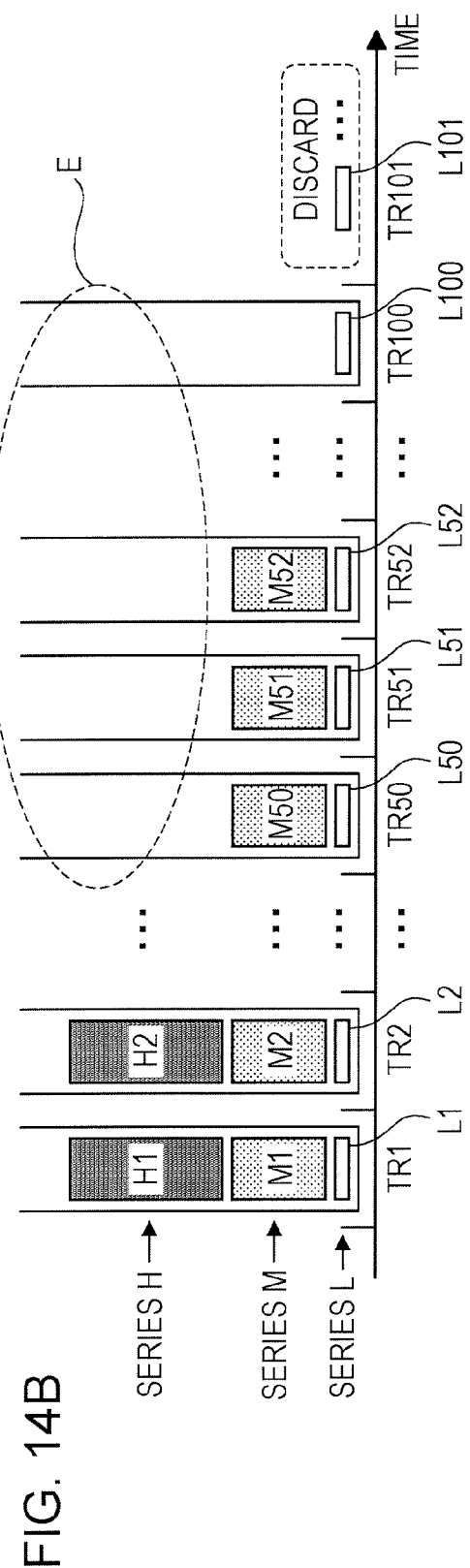

FIG. 14A and FIG. 14B illustrate a comparative example of the size of the buffer. FIG. 14A illustrates the size of each buffer along the time axis in the comparative example. In the comparative example, the sizes of the buffers are equalized in view of 10 Mbits as the total size of the buffer module 130. In such a case, the size of each buffer is 100 kbits. Each buffer corresponds to a time band of 0.1 ms, and scheduling is extendable to 10 ms into the future.

FIG. 14B illustrates an example of flows of three rates in the same manner as in FIG. 10A. The meaning of the series H, M, and L remains the same as those illustrated in FIG. 10A. Packet L101 and subsequent packets in a low rate flow may not be scheduled but discarded. On the other hand, as illustrated in FIG. 13, many of the packets in the high rate flow are likely to be scheduled close to the current point of time. An area labeled E in FIG. 14A and FIG. 14B is less likely to be used for buffering.

As illustrated in FIG. 10B, the larger the time difference between the current point of time and the time region (TR) is, the smaller the size of the buffer corresponding to the time region is set to be. More specifically, a sufficient buffer amount is prepared close to the current point of time, but the size of each buffer is reduced more as it is further into the future. With this arrangement, a surplus memory space is available in comparison with the comparative example. The surplus memory space will be used to expand the region in the time axis. More specifically, the comparative example allows the time table to extend down to a 10 ms point in the future while the method of the second embodiment allows the time table to extend down to a 35 ms point into the future. Burst resistance is thus increased in the low rate flow.

In the second embodiment, the sizes of the buffers are changed in three steps. Optionally, the sizes of the buffers may be changed in two steps or in four or more steps.

Third Embodiment

A third embodiment is described below. The following discussion focuses on a difference between the second embodiment and the third embodiment, and the discussion of features common to the two embodiments is omitted herein.

In the second embodiment, the buffer sizes are set to be different in response to the time difference from the current point of time with the time bands to read the buffers set to be equal to each other. On the other hand, it is contemplated that the sizes of the buffers allocated to unit time are set to be different by changing, according to the buffer, the time band to read. The relay apparatus of the third embodiment is identical to the relay apparatus of the second embodiment. Element names and symbol numbers used in the discussion of the third embodiment are identical to those of the second embodiment.

Figure 15A:
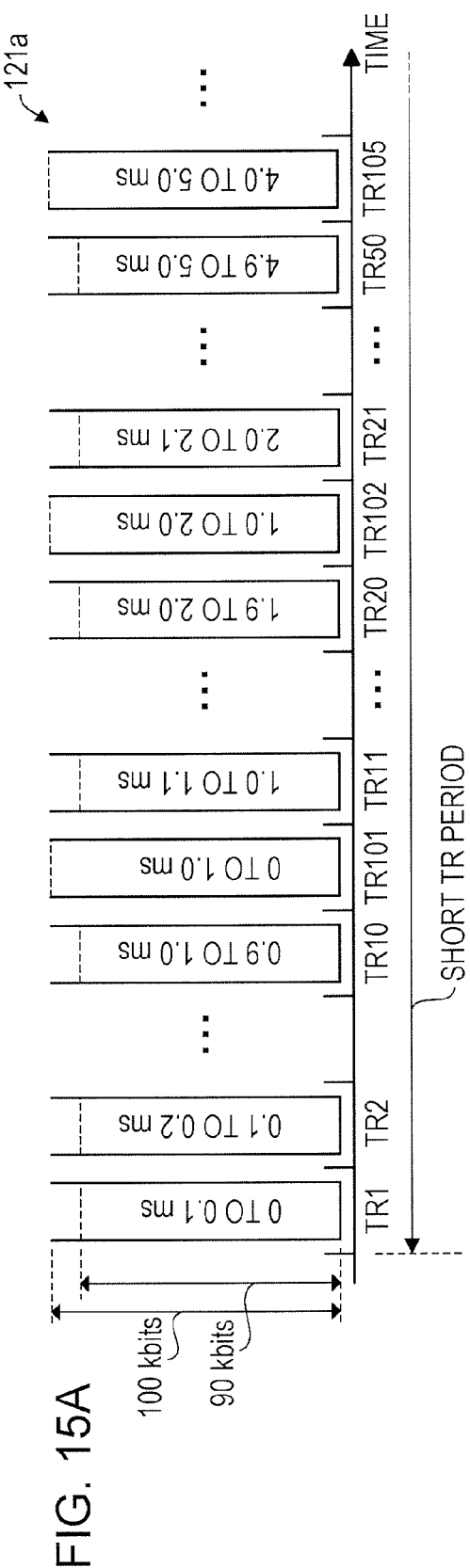
FIG. 15A and FIG. 15B illustrate an example of a time table of a third embodiment.
Figure 15B:
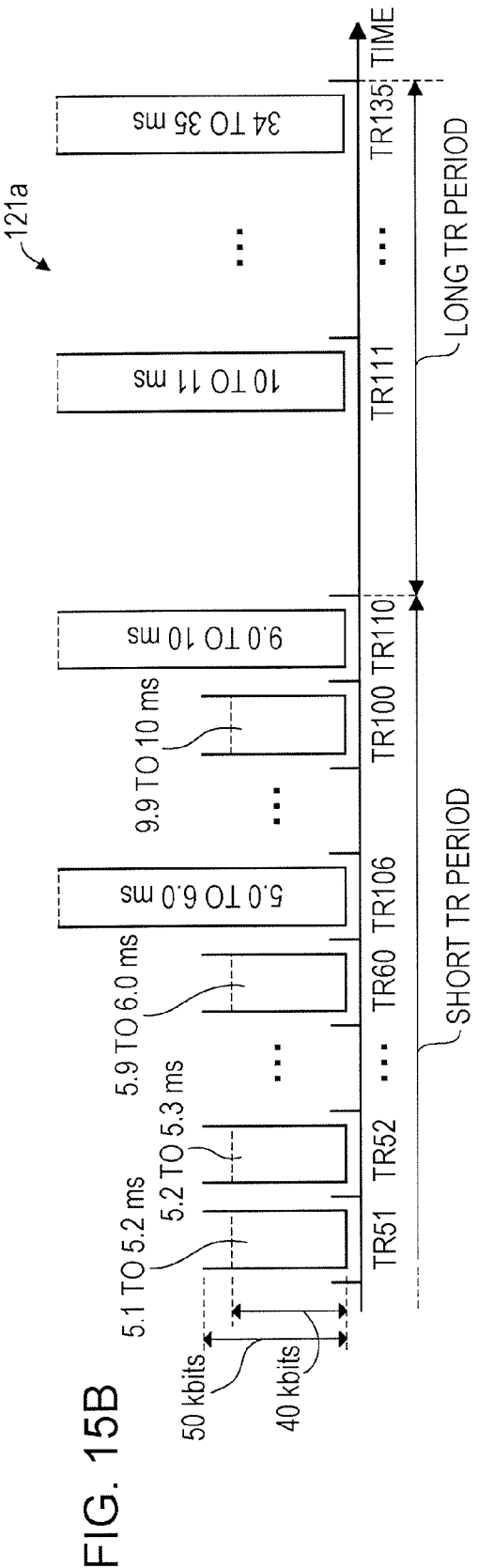

FIG. 15A and FIG. 15B illustrate an example of a time table of the third embodiment. FIG. 15A illustrates time regions extended until 5 ms later. FIG. 15B illustrates time regions extended from 5 ms later. The time table 121*a* is stored in place of the time table 121 on the storage unit 120. In the third embodiment, two buffer groups are used.

The buffers in a first group are associated with time regions that are formed by segmenting the duration from the current point of time to 10 ms later by a unit of 0.1 ms. The buffers in a second group are associated with time regions that are formed by segmenting the duration from the current point of time to 35 ms later by a unit of 1 ms. The buffer as a target to be read in the first group are switched in steps of 0.1 ms. The buffer as a target to be read in the second group are switched in steps of 1 ms.

A time band from the current point of time (a time point of 0) to 0.1 ms later is the time region TR1. A time band from 0.1 ms later to 0.2 ms later is the time region TR2. A total number of 100 time regions is defined by segmenting the duration until 10 ms later by a unit of 0.1 ms. More specifically, there are present the time regions TR1, TR2, . . . , and TR100. The buffers in the first group are thus associated with the time regions, each shorter than the time region of each buffer of the second group. A period from the current point of time to 10 ms later, with which the buffers in the first group are associated, are referred to as a short TR period.

A time band from the current point of time (a time point of 0) to 1.0 ms later is a time region TR101. A time band from 1.0 ms later to 2.0 ms later is a time region TR102. A total number of 35 time regions is thus defined by segmenting the period from the current point of time to 35 ms later by a unit of 1.0 ms. More specifically, there are present time regions TR101, TR102, . . . , and TR135. Each buffer in the second group is thus associated with a time region longer in time length than the time region of each buffer in the first group. A period from 10 ms later to 35 ms later allocated to the buffers in the second group is referred to as a long TR period.

The size of the buffers in the first group is controlled to be smaller as the time difference between the current point of time and the corresponding time region is larger. More specifically, the size of the buffers of the time regions TR1 through TR50 is set to be 90 kbits. The size of the buffers of the time regions TR51 through TR100 is set to be 40 kbits. The size of the buffers in the second group is 100 kbits. The sizes of the buffers in the first group are set to be smaller than the size described with reference to the second embodiment by 10 kbits. This is intended to read from the buffer in the second group as well. A total buffer capacity of the buffers of the buffer module 130 is 10 Mbits.

Figure 16:
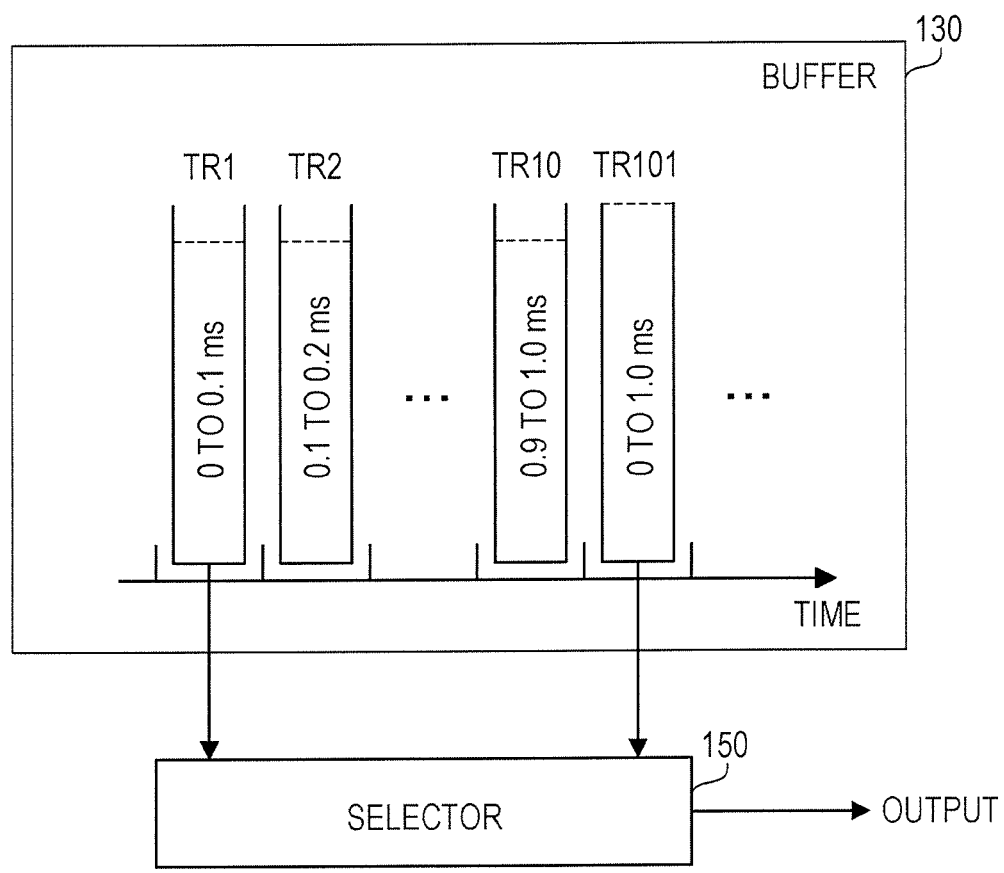
FIG. 16 illustrates an example of a selector of the third embodiment.

FIG. 16 illustrates an example of a selector 150 of the third embodiment. The selector 150 reads packets from two buffers during 0.1 ms (one unit read time), and outputs the read packets. The selector 150 may read from the buffers in the first group with a higher priority. If packets are read from two buffers corresponding to the time regions TR1 and TR101 during a given time band, the buffer corresponding to the time region TR101 is read subsequent to the reading of the buffer corresponding to the time region TR1.

The selector 150 may read packets from the two buffers through weighted fair queuing (WFQ) in unit time. For example, the buffer corresponding to the time region TR1 may be weighted with 9, and the buffer corresponding to the time region TR101 may be weighted with 1. In such a case, data of 9 units is read from the buffer corresponding to the time region TR1, followed by the reading of data of 1 unit from the buffer corresponding to the time region TR101. Then again, data of 9 units is read from the buffer corresponding to the time region TR1, followed by the reading of data of 1 unit from the buffer corresponding to the time region TR101. This process is repeated during 0.1 ms. Since the read target is switched in accordance with the weighting, burstiness is alleviated more than reading with priority setting.

FIG. 17 illustrates a buffer management table 122*a* of the third embodiment. The buffer management table 122*a* is stored in place of the buffer management table 122 on the storage unit 120. The buffer management table 122*a* includes items for TRs, upper limit values, current queue lengths, and TR type. Contents listed at the items for the TRs, the upper limit values, and the current queue lengths are identical to those in the buffer management table 122. Information indicating a time band of a corresponding time region is listed at the item of the TR type.

The buffer management table 122*a* lists information including "1" as TR, "90 k" as the upper limit value, "87 k" as the current queue length, "true" as the flag currently being read, and "0.1 ms" as the TR type. The listed information means that the size of the buffer corresponding to the time region TR1 is 90 kbits, that a packet of 87 kbits has already been stored, and that the buffer is a target currently being read. The information is also intended to mean that the time band of the time region TR1 is 0.1 ms.

In the third embodiment, two buffers of 0.1 ms TR type and 1.0 ms TR type are read. For this reason, the buffer corresponding to the time region TR101 is "true" as the flag currently being read. The other flags are "false".

In the following discussion, a buffer of "0.1 ms" TR type is occasionally referred to as a short TR buffer. A buffer of "1 ms" TR type is occasionally referred to as a long TR buffer.

FIG. 18 illustrates an example of a flow information table 123a of the third embodiment. The flow information table 123a is stored in place of the flow information table 123 on the storage unit 120. The flow information table 123a includes items for a flow number, an amount of data per short TR buffer, an amount of data per long TR buffer, a permissible delay, TR, and a remaining capacity. Contents of the flow number, the permissible delay, the TR, and the remaining capacity are identical to those listed in the flow information table 123. In the third embodiment, however, the storage destination even in the same flow may be both the long TR buffer and the short TR buffer. The value listed at the item of the remaining capacity corresponds to the value of the long TR buffer.

Listed at the item of the amount of data per short TR buffer is an amount of data stored on a buffer of "0.1 ms" TR type in the corresponding flow. Listed at the item of the amount of data per long TR buffer is an amount of data stored on a buffer of "1 ms" TR type in the corresponding flow.

For example, the flow information table 123a lists information including "1" as the flow number, "50 k" as the amount of data per short TR buffer, "100 k" as the amount of data per long TR buffer, "3TRs" as the permissible delay, "TR3" as TR, and "40 k" as the remaining capacity. The information means that the flow identified by the flow number 1 may permit a single buffer of "0.1 ms" TR type to store data of 50 kbits, and a single buffer of "1 ms" TR type to store data of 100 kbits. The information also means that a delay from the current point of time to 3 TRs into future (30 TRs in the short TR case, 10 times the value in the long TR case) is permitted at scheduling. The information further means that the packet of the flow was stored last on the buffer corresponding to the time region TR3, and that the remaining amount of data that the flow may store on the buffer is 40 kbits.

Figure 19:
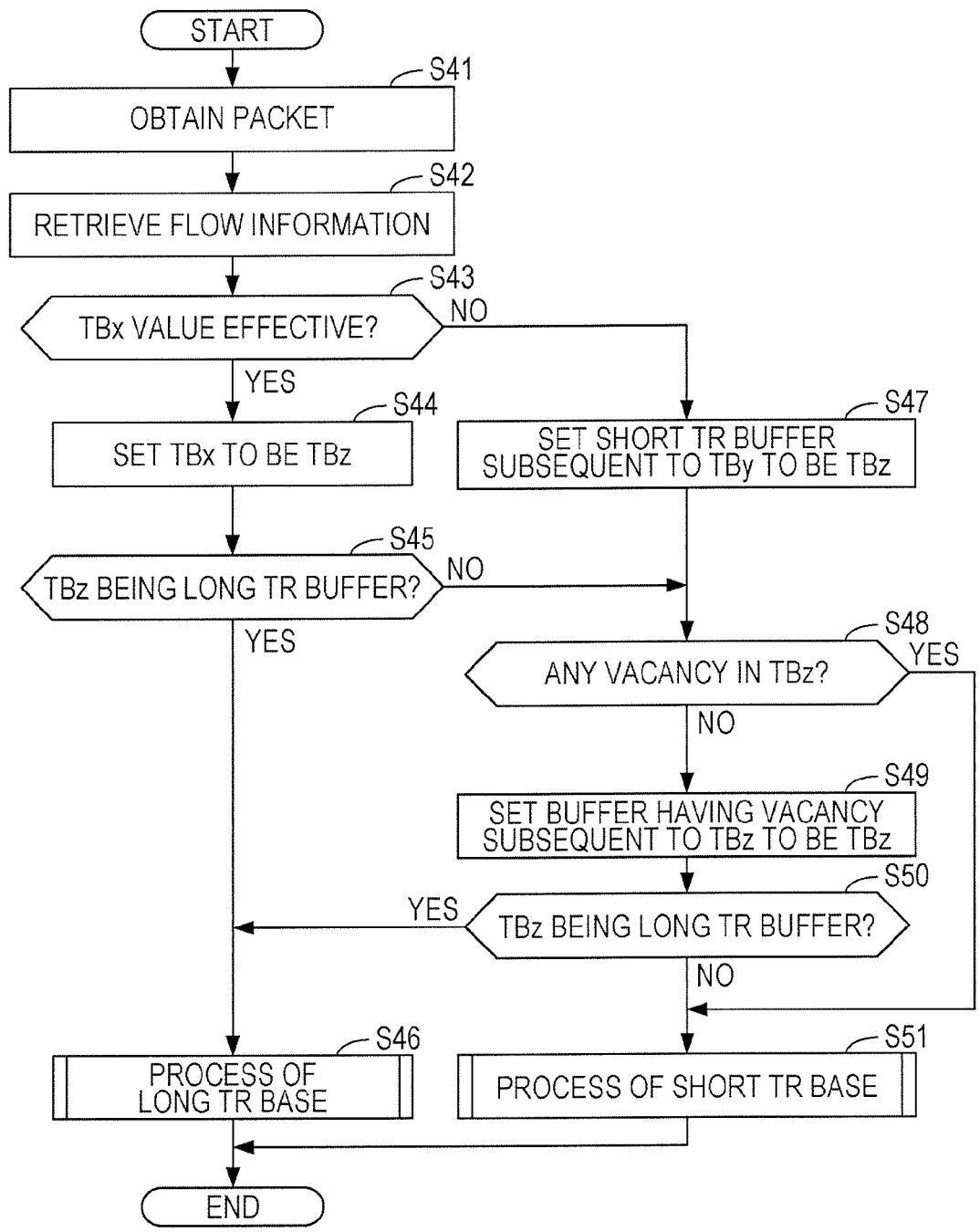
FIG. 19 is a flowchart illustrating an example of buffering of the third embodiment.

FIG. 19 is a flowchart illustrating an example of buffering of the third embodiment. The process of FIG. 19 is described with reference to step numbers.

Step S41: The controller 140 obtains a packet as a transfer target (in the following discussion, the packet may also be referred to as an incoming packet).

Step S42: The controller 140 retrieves the flow number of the packet. By referencing the time table 121a and the flow information table 123a, stored on the storage unit 120, the controller 140 retrieves information about a buffer TBx that is currently storing the packet. The buffer TBx is represented by information indicating the time region set at the item of TR in the flow information table 123a or a pointer pointing to the buffer corresponding to the time region.

Step S43: The controller 140 determines whether the information indicating the buffer TBx is an effective value. If the information indicates an effective value, processing proceeds to step S44. If the information does not indicate an effective value, processing proceeds to step S47.

Step S44: The controller 140 sets the buffer TBx to be a buffer candidate TBz that is to store an incoming packet.

Step S45: The controller 140 determines whether the buffer TBz is a long TR buffer. If the buffer TBz is a long TR buffer, processing proceeds to step S46. If the buffer TBz is not a long TR buffer, processing proceeds to step S48. The controller 140 references the buffer management table 122a to determine whether the buffer TBz is a long TR buffer.

Step S46: The controller 140 processes a long TR base. This operation is described in detail below.

Step S47: The controller 140 sets a short TR buffer subsequent to the buffer TBy currently being read to be a buffer TBz. Depending on the transfer rate and the packet length, a short TR buffer of the next time band may be a buffer corresponding to a time band jumped by one or more time bands.

Step S48: The controller 140 references the buffer management table 122a and the flow information table 123a, stored on the storage unit 120, to determine whether the buffer candidate TBz has a vacancy. If the buffer candidate TBz has a vacancy, processing proceeds to step S51. If the buffer candidate has no vacancy, processing proceeds to step S49. The buffer candidate TBz having a vacancy means that the current queue length of the buffer TBz has not reached the upper limit value in the buffer management table 122a and that a remaining capacity on the buffer TBz in the target flow is greater than 0 in the flow information table 123a.

Step S49: The controller 140 sets a buffer having a vacancy subsequent to the buffer TBz to be a buffer TBz. Depending on the transfer rate and the packet length, a next buffer (of the next time band) may be a buffer corresponding to a time band jumped by one or more time bands. If that buffer has no vacancy, another next buffer is selected as the buffer TBz. The presence or absence of the vacancy in the buffer may be determined in the same way as in step S48. When a buffer is selected from the short TR region, a buffer of the long TR period is not selected. If no buffer is present as a candidate in the short TR period, a buffer may be selected from the long TR period.

Step S50: The controller 140 determines whether the buffer TBz is a long TR buffer. If The buffer TBz is a long TR buffer, processing proceeds to step S46. If the buffer TBz is not a long TR buffer, processing proceeds to step S51.

Step S51: The controller 140 performs a process of a short TR base. There is more on this later.

The process of the long TR base in step S46 is described below.

FIG. 20 is a flowchart illustrating a process example of a long time region (TR) base of the third embodiment. The process of FIG. 20 is described below in accordance with step numbers of FIG. 20.

Step S61: The controller 140 references the buffer management table 122a and the flow information table 123a, stored on the storage unit 120, to determine whether the buffer TBz has a vacancy. If the buffer TBz has a vacancy, processing proceeds to step S63. If the buffer TBz has no vacancy, processing proceeds to step S62. The buffer candidate TBz having a vacancy means that the current queue length of the buffer TBz has not reached the upper limit value in the buffer management table 122a and that a remaining capacity on the buffer TBz in the target flow is greater than 0 in the flow information table 123a.

Step S62: The controller 140 sets a TR buffer subsequent to the buffer TBy currently being read to be a buffer candidate TBz. Depending on the transfer rate and the packet length, a TR buffer of the next time band may be a buffer corresponding to a time band jumped by one or more time bands. Processing returns to step S61. If the buffer TBz is a long TR buffer included in the long TR period, the controller 140 selects a long TR buffer as a buffer in the next time band. On the other hand, if the buffer TBz is a short TR buffer included in the short TR period, the controller 140 selects a short TR buffer as a buffer in the next time band.

Step S63: The controller 140 references the time table 121a and the flow information table 123a to determine whether the time difference between the buffer TBz and the buffer TBy currently being read is equal to or below the permissible delay N. If the time difference is equal to or below the permissible delay N, processing proceeds to step S65. If the time difference is above the permissible delay N, processing proceeds to step S64.

Step S64: The controller 140 discards the incoming packet. Processing thus ends.

Step S65: The controller 140 stores the incoming packet on the buffer TBz. The controller 140 updates the buffer management table 122a. More specifically, a storage result of the packet in step S65 is reflected in the buffer management table 122a. In other words, the data length of the newly stored one of the incoming packets is added to the value of the current queue length. The buffer TBz in step S65 may be a long TR buffer or a short TR buffer depending on the operations in step S61 and S62.

Step S66: The controller 140 determines whether the entire incoming packet has been stored. If the incoming packet has not completely been stored (in other words, an excess portion remains), processing proceeds to step S67. If the incoming packet has completely been stored, processing proceeds to step S72.

Step S67: The controller 140 sets a buffer having a vacancy subsequent to the buffer TBz to be a buffer TBz. Depending on the transfer rate and the packet length, a next buffer (of the next time band) may be a buffer corresponding to a time band jumped by one or more time bands. If that buffer has no vacancy, another next buffer is selected as the buffer TBz. The presence or absence of the vacancy in the buffer may be determined in the same way as in step S61. If the buffer TBz is a short TR buffer included in the short TR period, the controller 140 selects a short TR buffer as a next buffer.

Step S68: The controller 140 determines whether the buffer TBz is a short TR buffer. If the buffer TBz is a short TR buffer, processing proceeds to step S69. If the buffer TBz is not a short TR buffer, processing returns to step S65.

Step S69: The controller 140 stores the incoming packet (an unstored portion) on the buffer TBz (the buffer TBz is a short TR buffer). The controller 140 updates the buffer management table 122a. More specifically, the length of the newly stored data of the incoming packet is added to the value of the current queue length.

Step S70: The controller 140 determines whether the entire incoming packet has been stored. If the incoming packet has not completely been stored, processing proceeds to step S71. If the incoming packet has completely been stored, processing proceeds to step S72.

Step S71: The controller 140 sets a buffer having a vacancy subsequent short TR buffer to the buffer TBz to be a buffer TBz. Processing returns to step S69.

Step S72: The controller 140 updates the flow information table 123a. More specifically, the controller 140 sets the buffer TBz that stored the incoming packet (or part thereof) last to be the buffer TBx, and sets the time region of the buffer TBx at the item of TR in the flow information table 123a. The controller 140 subtracts an amount of data stored last on the buffer TBx from the remaining capacity of the flow, and sets the resulting difference at the item of the remaining capacity in the flow information table 123a. If the buffer TBx is a short TR buffer, a maximum value of remaining capacity is a set value of an amount of data per short TR buffer. If the buffer TBx is a long TR buffer, a maximum value of remaining capacity is a set value of an amount of data per long TR buffer.

This process may also be referred to as scheduling on the long TR base. The scheduling on the long TR base is more specifically discussed below.

Figure 21A:
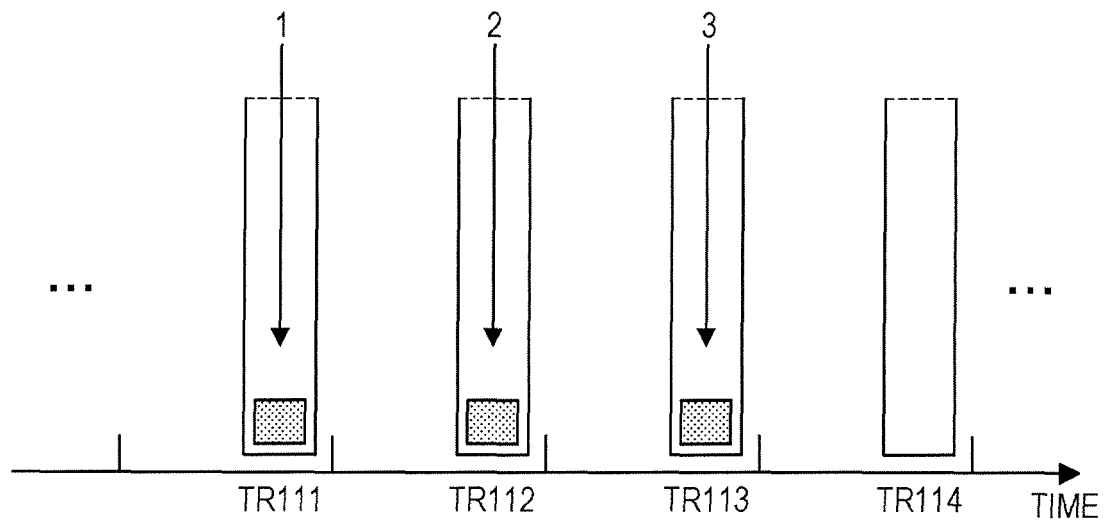
FIG. 21A and FIG. 21B illustrate a scheduling example of the long TR base of the third embodiment.
Figure 21B:
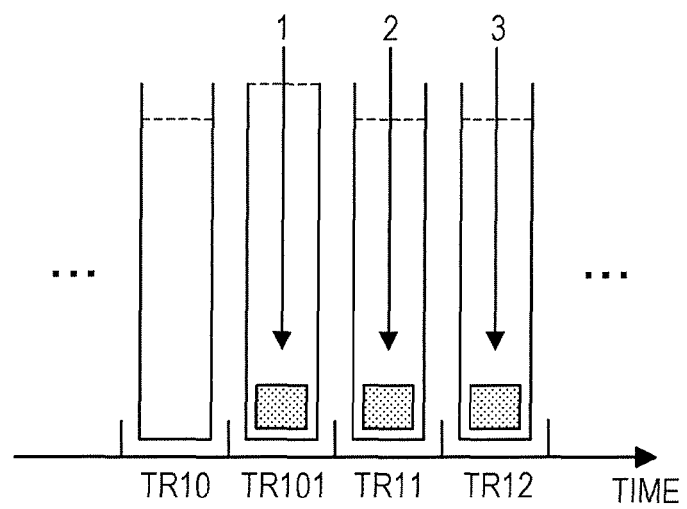

FIG. 21A and FIG. 21B illustrate a scheduling example of the long TR base of the third embodiment. FIG. 21A illustrates the case in which long TR buffers that serve as a start point of storage in the long TR period. There are present, in the long TR period, buffers corresponding to time regions TR111, TR112, TR113, and TR114. The incoming packets are stored, starting with the time region TR111. The incoming packet is first stored on the buffer corresponding to the time region TR111. If there is an excess, the excess is stored on the buffer corresponding to the time region TR112. If there is a further excess, the further excess is stored on the buffer corresponding to the time region TR113. Each of the buffers is a long TR buffer.

FIG. 21B illustrates the case in which long TR buffers that serve as a start point of storage in the short TR period. There are present, in the short TR period, time buffers corresponding to short TRs and long TRs in a mixed fashion, namely, corresponding to regions TR10, TR101, TR11, and TR12. The incoming packets are stored, starting with the time region TR101. The incoming packet is first stored on the buffer corresponding to the time region TR101. If there is an excess, the excess is stored on the buffer corresponding to the time region TR11. If there is a further excess, the further excess is stored on the buffer corresponding to the time region TR12. The buffer corresponding to the time region TR101 is a long TR buffer. The buffers corresponding to the time regions TR11 and TR12 are short TR buffers.

The control operation of the controller 140 is performed on a per flow basis. The process of the short TR base in step S51 of FIG. 19 is described sequentially below.

Figure 22:
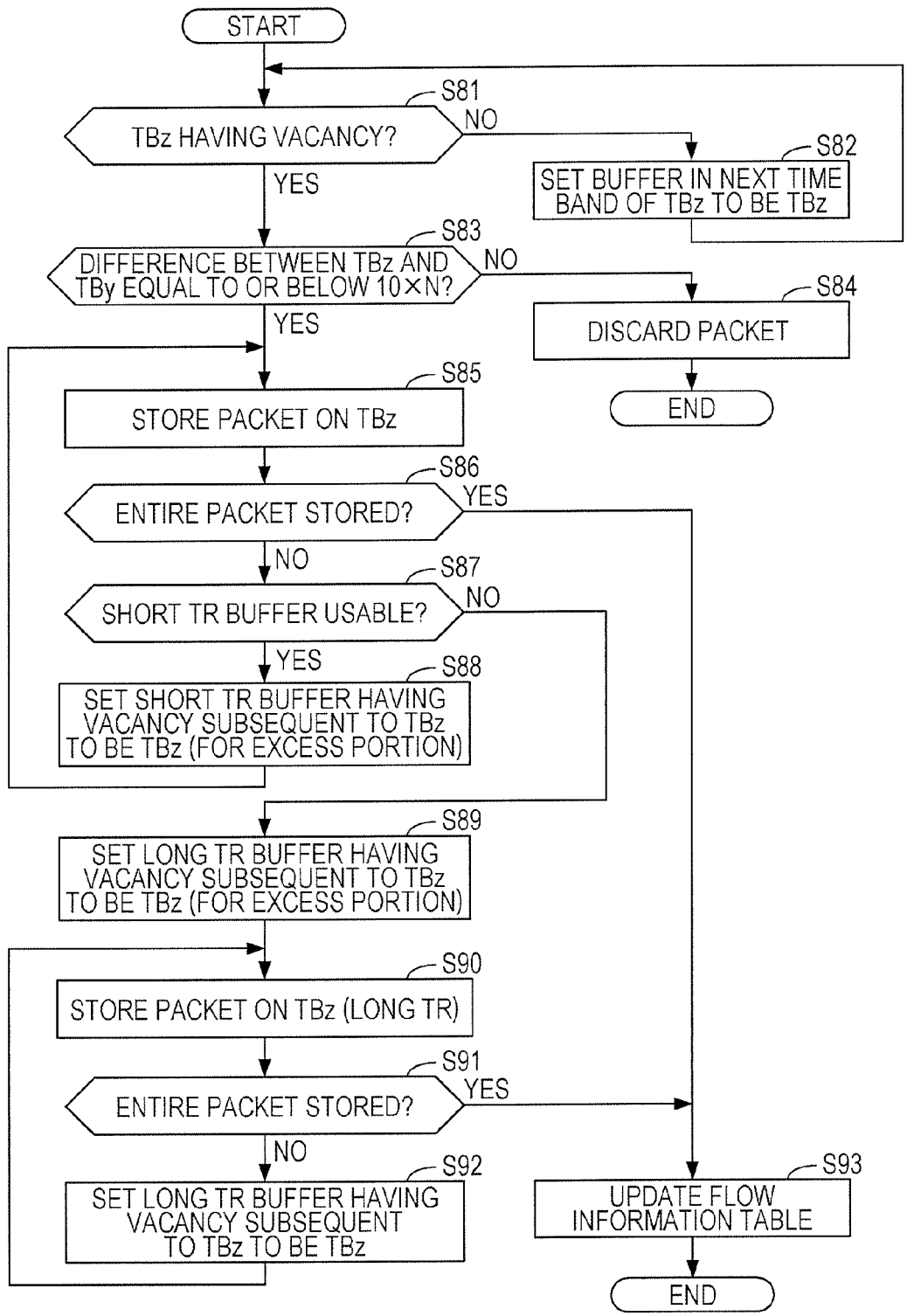
FIG. 22 is a flowchart illustrating a process of a short TR base of the third embodiment.

FIG. 22 is a flowchart illustrating a process of a short TR base of the third embodiment. The process of FIG. 22 is described with reference to step numbers.

Step S81: The controller 140 references the buffer management table 122a and the flow information table 123a, stored on the storage unit 120, to determine whether the buffer candidate TBz has a vacancy. If the buffer candidate TBz has a vacancy, processing proceeds to step S83. If the buffer candidate TBz has no vacancy, processing proceeds to step S82. The buffer candidate TBz having a vacancy means that the current queue length of the buffer TBz has not reached the upper limit value in the buffer management table 122a and that a remaining capacity on the buffer TBz in the target flow is greater than 0 in the flow information table 123a.

Step S82: The controller 140 sets a buffer in the time band subsequent to the buffer TBz to be a buffer candidate TBz. Depending on the transfer rate and the packet length, a buffer of the next time band may be a buffer corresponding to a time band jumped by one or more time bands. Processing returns to step S81. The controller 140 selects a buffer in a next time band from short TR buffers in principle. If the buffer TBz is a short TR buffer in the vicinity of the border between the short TR period and the long TR period, the controller 140 may select a long TR buffer as a buffer in the next time band.

Step S83: The controller 140 references the time table 121a and the flow information table 123a to determine whether the time difference between the buffer TBz and the buffer TBy currently being read is equal to or below the permissible delay 10×N. If the time difference is equal to or below the permissible delay 10×N, processing proceeds to step S85. If the time difference is above the permissible delay 10×N, processing proceeds to step S84. The permissible capacity is multiplied by 10 because the permissible delay N set in the flow information table 123a corresponds to that of the long TR. However, if a long TR buffer is selected in step S82, the permissible delay N is not multiplied by 10.

Step S84: The controller 140 discards the incoming packet. Processing thus ends.

Step S85: The controller 140 stores the incoming packet on the buffer TBz. The controller 140 updates the buffer management table 122a. More specifically, a storage result of the packet in step S85 is reflected in the buffer management table 122a. In other words, the data length of the newly stored one of the incoming packets is added to the value of the current queue length. The buffer TBz in step S85 may be a long TR buffer or a short TR buffer depending on the operations in step S81 and S82.

Step S86: The controller 140 determines whether the entire incoming packet has been stored. If the incoming packet has not completely been stored (in other words, an excess portion remains), processing proceeds to step S87. If the incoming packet has completely been stored, processing proceeds to step S93.

Step S87: The controller 140 determines whether a short TR buffer is usable as a buffer having a vacancy subsequent to the buffer TBz. If the short TR buffer is usable, processing proceeds to step S88. If the short TR buffer is not usable, processing proceeds to step S89. The controller 140 references the time table 121a to determine whether a short TR buffer is usable as a buffer having a vacancy subsequent to the buffer TBz. In the example of the time table 121a, the time region TR100 is last time region in the short TR period. If a buffer at the time region TR100 or earlier is selectable as a buffer having a vacancy subsequent to the buffer TBz, a short TR buffer is usable as a buffer having a vacancy prior to the buffer TBz. If only a buffer at the time region TR111 or later is selectable, a short TR buffer is not usable as a buffer having a vacancy.

Step S88: The controller 140 sets a buffer having a vacancy subsequent short TR buffer to the buffer TBz to be a buffer TBz. Depending on the transfer rate and the packet length, a next buffer (of the next time band) may be a buffer corresponding to a time band jumped by one or more time bands. Processing proceeds to step S85.

Step S89: The controller 140 sets a long TR buffer having a vacancy subsequent to the buffer TBz to a buffer TBz. In the same manner as in step S88, depending on the transfer rate and the packet length, a next buffer (of the next time band) may be a buffer corresponding to a time band jumped by one or more time bands.

Step S90: The controller 140 stores the incoming packet (an unstored portion) on the buffer TBz (the buffer TBz is a long TR buffer). The controller 140 updates the buffer management table 122a. More specifically, the length of the newly stored data of the incoming packet is added to the value of the current queue length.

Step S91: The controller 140 determines whether the entire incoming packet has been stored. If the incoming packet has not completely been stored, processing proceeds to step S92. If the incoming packet has completely been stored, processing proceeds to step S93.

Step S92: The controller 140 sets a long TR buffer having a vacancy subsequent to the buffer TBz to be a buffer TBz. Processing returns to step S90.

Step S93: The controller 140 updates the flow information table 123a. More specifically, the controller 140 sets the buffer TBz that stored the incoming packet (or part thereof) last to be the buffer TBx, and sets the time region of the buffer TBx at the item of TR in the flow information table 123a. The controller 140 subtracts an amount of data stored last on the buffer TBx from the remaining capacity of the flow, and sets the resulting difference at the item of the remaining capacity in the flow information table 123a. If the buffer TBx is a short TR buffer, a maximum value of remaining capacity is a set value of an amount of data per short TR buffer. If the buffer TBx is a long TR buffer, a maximum value of remaining capacity is a set value of an amount of data per long TR buffer.

This process is may be referred to as scheduling on the short TR base. In the short TR period, the scheduling is performed using a short TR buffer. When no short TR buffer becomes available in the short TR period, the scheduling is performed using a long TR buffer in the long TR period. The scheduling on the short TR base is specifically discussed below.

Figure 23A:
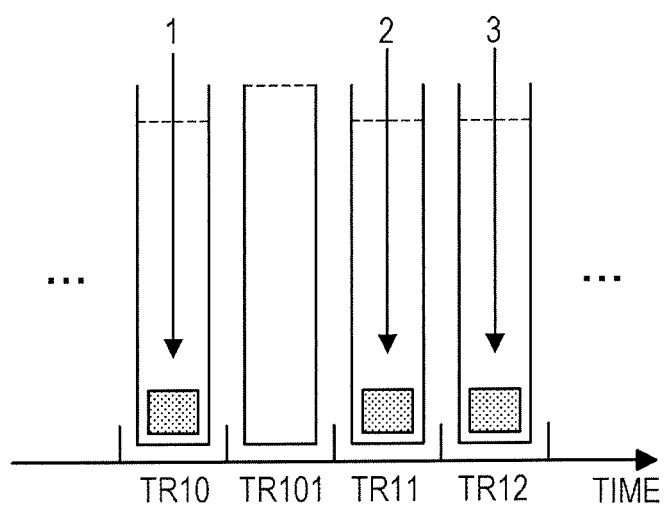
FIG. 23A and FIG. 23B illustrate a scheduling example of the short TR base of the third embodiment.
Figure 23B:
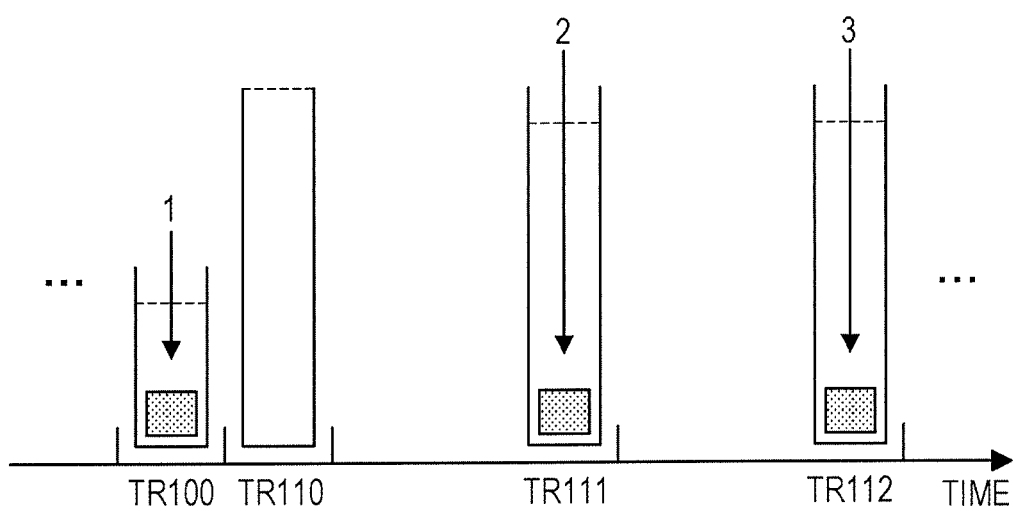

FIG. 23A and FIG. 23B illustrate a scheduling example of the short TR base of the third embodiment. FIG. 23A illustrates a first case of the scheduling. There are present, in the short TR period, buffers corresponding to short TRs and long TRs in a mixed fashion, namely, corresponding to regions TR10, TR101, TR11, and TR12. The incoming packets are stored, starting with the time region TR10. The incoming packet is first stored on the buffer corresponding to the time region TR10. If there is an excess, the excess is stored on the buffer corresponding to the time region TR11. If there is a further excess, the further excess is stored on the buffer corresponding to the time region TR12. The buffers corresponding to the time regions TR11 and TR12 are short TR buffers.

FIG. 23B illustrates a short TR buffer at the border between the short TR period and the long TR period, with the short TR serving as a start point of storage. For example, buffers corresponding to the time regions TR100, TR110, TR111 and TR112 coexist in the border between the short TR period and the long TR period. The incoming packets are stored on the buffers, starting with the time region TR100. The incoming packet is first stored on the buffer corresponding to the time region TR100. If there is an excess, the excess is stored on the buffer corresponding to the time region TR111. If there is a further excess, the further excess is stored on the buffer corresponding to the time region TR112. The buffer corresponding to the time region TR100 is a shot TR buffer. The buffers corresponding to the time regions TR111 and TR112 are long TR buffers. The buffer corresponding to the time region TR110 is jumped because the buffer corresponding to the time region TR110 and the buffer corresponding to the time region TR100 overlap in read time band.

Figure 24:
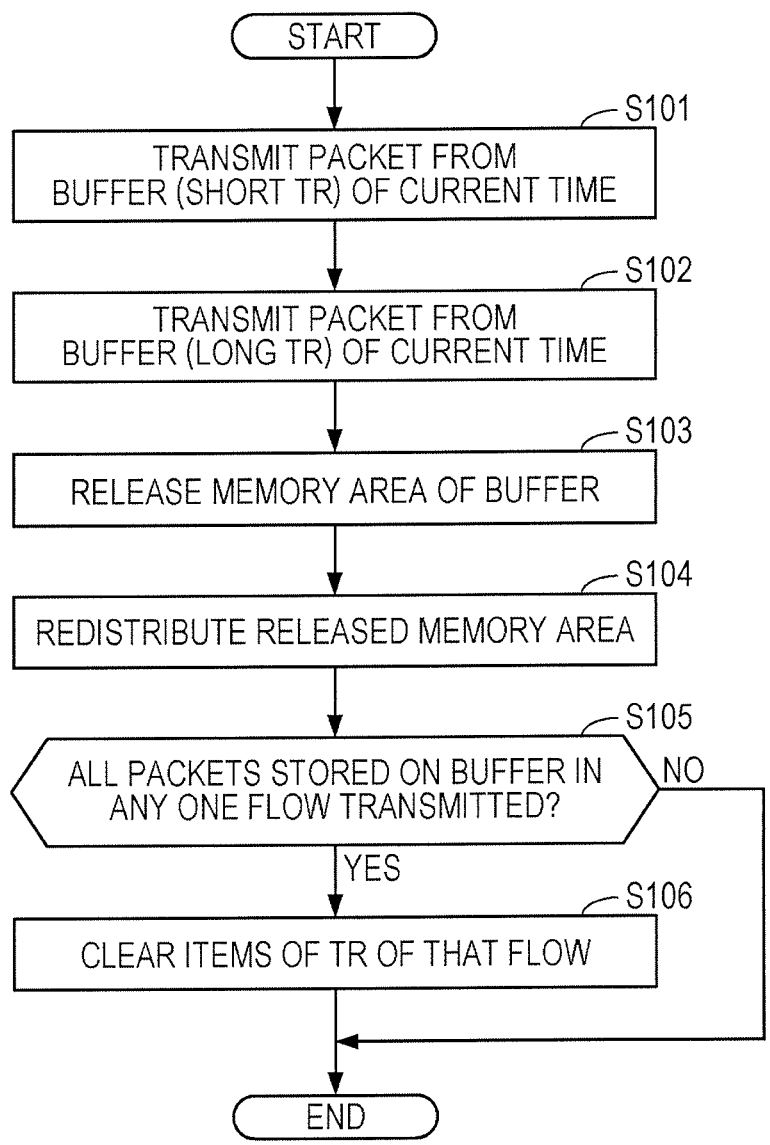
FIG. 24 is a flowchart illustrating an example of a buffer redistribution of the third embodiment.

FIG. 24 is a flowchart illustrating an example of a buffer redistribution of the third embodiment. The process of FIG. 24 is described in accordance with step numbers.

Step S101: The selector 150 references the time table 121a stored on the storage unit 120, extracts the packet from the short TR buffer corresponding to the current point of time (the buffer having true as a flag currently being read and of 0.1 ms TR type in the buffer management table 122a), and transmits the packet. For example, the selector 150 reads a short TR buffer with a higher priority.

Step S102: The selector 150 references the time table 121a, extracts the packet from the long TR buffer corresponding to the current point of time (the buffer having true as a flag currently being read and of 1 ms TR type in the buffer management table 122a), and transmits the packet.

Step S103: The controller 140 releases the memory area of the buffer from which the packet has been read. Reading is completed from each short TR buffer every 0.1 ms. Reading is completed from each long TR buffer every 1 ms. Reading may now be completed from the buffer corresponding to the time region TR1 in the time table 121a. In such a case, a memory area of 90 kbits is released. For example, reading may now be completed from the buffer corresponding to the time region TR101. In such a case, a memory area of 100 kbits is released.

Step S104: The controller 140 redistributes the released memory area. For example, the memory area of the buffer corresponding to the time region TR1 may now be released. The controller 140 adds 50 kbits of the released memory area to the buffer corresponding to the time region TR51 (the capacity of the buffer becomes a total of 90 kbits). The controller 140 then adds 40 kbits of the released memory area to the buffer corresponding to a new time region TR1 (from 9.9 ms later to 10 ms later) (the capacity of the buffer becomes 40 kbits). In another example, the memory area of the buffer corresponding to the time region TR101 may now be released. The controller 140 then adds the whole capacity of the released memory area (100 kbits) to the buffer corresponding to a new time region TR101 (from 34 ms later to 35 ms later).

Step S105: The controller 140 determines whether all the packets stored on the buffers in any of the flows have been transmitted. If all the packets stored on the buffers in any of the flows have been transmitted, processing proceeds to step S106. If not all the packets stored on the buffers in any of the flows have been transmitted, processing ends. The completion of step S101 or S102 of the reading of the buffer of the time region indicated at the item of TR in any flow in the flow information table 123*a* means that all the packets stored on the buffer in any of the flows are transmitted.

Step S106: The controller 140 clears the item of TR in the flow information table 123*a* for the flow in which all the buffered packets have been transmitted. If the item of TR is cleared, a valid value of the pointer of the buffer corresponding to the item of TR in the time table 121*a* is difficult to obtain.

The size of each buffer illustrated in FIG. 15A and FIG. 15B is thus maintained. The switching of the short TR buffers as read targets is performed in concert with the switching of the long TR buffers as read targets in timing so that series of the buffers to be read are not disturbed. In steps S101 and S102, packets may be read from the short TR buffers and the long TR buffers using the WFQ technique as described previously.

In accordance with the third embodiment, the two groups of buffers including the short TR buffers and the long TR buffers are arranged. In the third embodiment, the reading time width of each long TR buffer is set to be 1 ms, which is ten times as long as the reading time width of each short TR buffer. The long TR buffer is used instead of the size of 10 kbits used in the second embodiment. A total number of 350 time regions is managed in the second embodiment while a total number of 135 time regions is managed in the third embodiment. Furthermore, the scheduling is performed down to a 35 ms time point in each of the second and third embodiment. In the third embodiment, a buffer capacity is efficiently reserved for a low rate flow, and burst resistance is thus increased. Since the number of time regions to be managed is reduced, calculation costs in the buffer management are reduced.

Fourth Embodiment

A fourth embodiment is described below. The following discussion focuses on a difference between the fourth embodiment and the second and third embodiments, and the discussion of features common to these embodiments is omitted.

In accordance with the third embodiment, the scheduling is performed using both the short TR buffer and the long TR buffer regardless of the transfer rate of the flow. In the third embodiment, packets in a single flow may be stored on both the short TR buffer and the long TR buffer. Alternatively, packets may be stored on the buffers of the short TR packet and the long TR packet depending on the flow as in the fourth embodiment. The method of the fourth embodiment is described below.

The relay apparatus of the fourth embodiment is identical to the relay apparatus of the second embodiment. In the fourth embodiment, names and symbol numbers of elements identical to those in the second embodiment are used. In the fourth embodiment, the time table 121*a* of FIG. 15 and the buffer management table 122*a* of FIG. 17 are used. Also in the fourth embodiment, the selector 150 reads from both the short TR buffer and the long TR buffer as illustrated in FIG. 16.

FIG. 25 illustrates a flow information table 123*b* of the fourth embodiment. The flow information table 123*b* is stored in place of the flow information table 123 on the storage unit 120. The flow information table 123*b* includes items for a flow number, an amount of data per buffer, a permissible delay, TR, a remaining capacity, and a TR type. Contents of the flow number, the amount of data per buffer, the permissible delay, the TR, and the remaining capacity are identical to those listed in the flow information table 123.

Information indicating which buffer, a short TR buffer or a long TR buffer, to use for scheduling is listed at the item of the TR type. As in the third embodiment, the reading time width of the short TR buffer is 0.1 ms, and the reading time width of the long TR buffer is 1 ms.

For example, the flow information table 123*b* lists information including "1" as the flow number, "50 k" as the amount of data per buffer, "30TRs" as the permissible delay, "TR3" as TR, "40 k" as the remaining capacity, and "0.1 ms" as the TR type. The information means that the flow identified by the flow number 1 may permit a single buffer to store data of 50 kbits, and that a delay from the current point of time to 30TRs into future is permitted in scheduling. The information further means that the packet of the flow was stored last on the buffer corresponding to the time region TR3, and that the remaining amount of data that the buffer in the flow may store is 40 kbits. The information also means that the buffer used in the scheduling is a short TR buffer.

The short TR buffer is used for a flow of a relatively high rate in the flow information table 123*b*. The long TR buffer is used for a flow of a relatively low rate. This is intended to cause the size of each buffer along the time axis to be consistent with the scheduling discussed with reference to FIG. 13.

The controller 140 may automatically determine which buffer, a short TR buffer or a long TR buffer, to use in response to the transfer rate of each flow. For example, from among the flows, a short TR buffer may be used for a flow of a relatively high rate (for example, if a total of 10 flows are available, short TR buffers may be used for flows of the highest rate to the fifth highest rate). A long TR buffer may be used for a flow of a relatively low rate (for example, if a total of 10 flows are available, long TR buffers may be used for flows of the lowest rate to the fifth lowest rate). The controller 140 may register determination results on the flow information table 123*b*.

Figure 26:
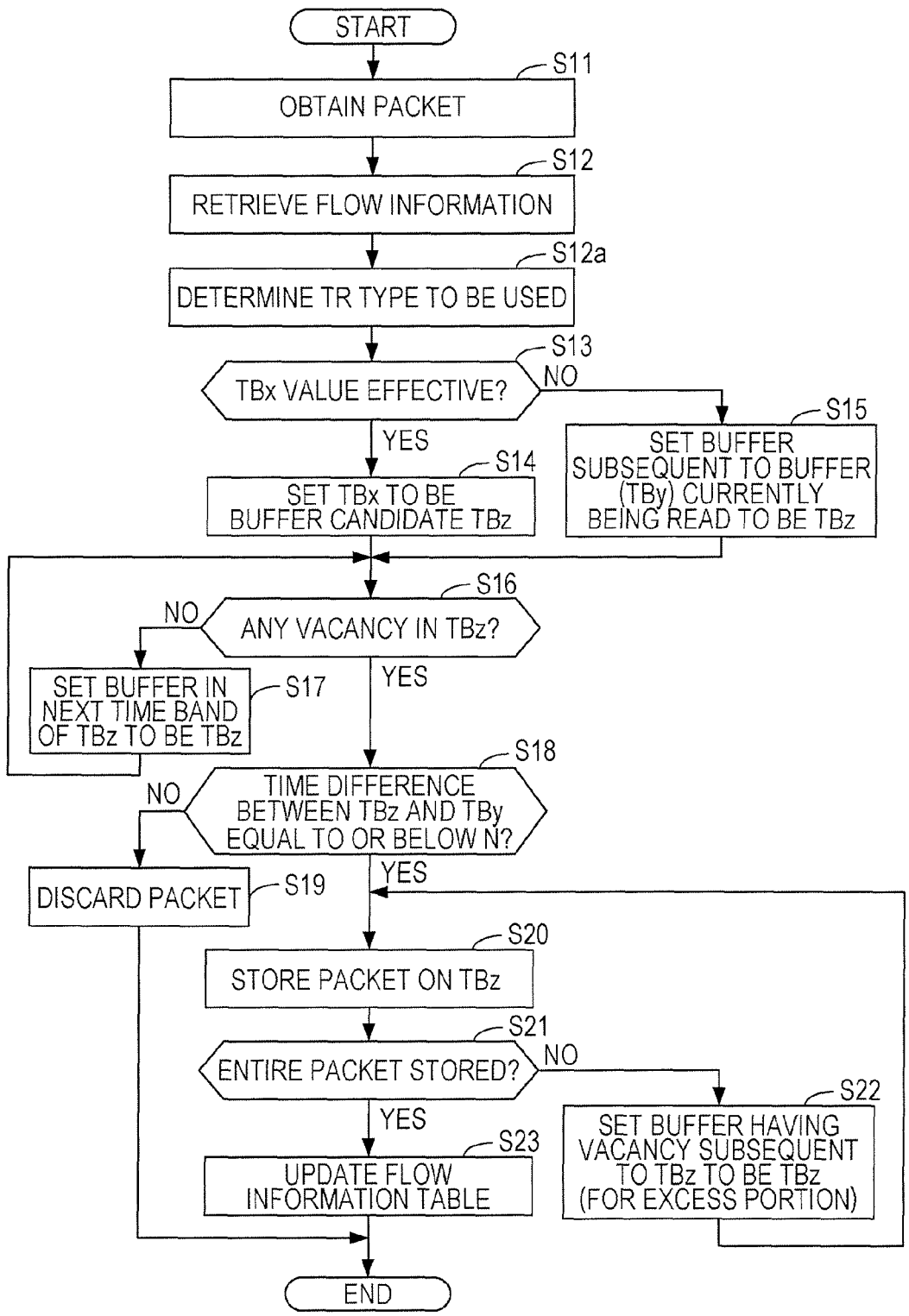
FIG. 26 is a flowchart illustrating an example of buffering of the fourth embodiment.

FIG. 26 is a flowchart illustrating an example of buffering of the fourth embodiment. The process of FIG. 26 is described with reference to step numbers thereof. The buffering process of the fourth embodiment is different from the buffering process of the second embodiment illustrated in FIG. 9 in that step S12*a* is inserted between step S12 and step S13. The other steps are identical to those of the buffering process of the second embodiment, and the discussion thereof is omitted. In each step of the buffering process of the fourth embodiment, however, the table referenced by the controller 140 is one of the time table 121*a*, the buffer management table 122*a*, and the flow information table 123*b*.

Step S12a: The controller 140 references the flow information table 123b to determine the TR type corresponding to the flow of the incoming packet. In step S12a and subsequent steps, the controller 140 uses the buffer corresponding to the TR type determined in step S12a (either a short TR buffer or a long TR buffer).

FIG. 27 illustrates scheduling of a high rate flow of the fourth embodiment. The controller 140 performs the scheduling of a high rate flow using only the short TR buffers. As illustrated in FIG. 27, the short TR buffers are those corresponding to time regions TR1, TR2, . . . , TR10, TR11, . . . , TR51, . . . , and TR100. In accordance with the flow information table 123b, packets having a flow number "1" are scheduled using only these short TR buffers.

FIG. 28 illustrates scheduling of a low rate flow of the fourth embodiment. The controller 140 performs the scheduling of a low rate flow using only the long TR buffers. As illustrated in FIG. 28, the long TR buffers are those corresponding to time regions TR101, TR102, . . . , TR110, TR111, . . . , and TR135. In accordance with the flow information table 123b, packets having a flow number "3" are scheduled using only these long TR buffers.

In contrast with the third embodiment, the short TR buffers and the long TR buffers are individually managed in the fourth embodiment. For example, the fourth embodiment is free from the concerted timing matching operation between the switching of the short TR buffers and the switching of the long TR buffers. The fourth embodiment is also free from the determination of an amount of data, namely, in response to determining which buffer, the short TR buffer or the long TR buffer, to store the data. The control process for the scheduling is thus facilitated. Since the buffers to use are determined according to whether the flow is a high rate flow or a low rate flow, the occurrence that the buffers in the future (in the long TR period) are predominantly used in the high rate flow is controlled.

In the third and fourth embodiments, the sizes of the short TR buffers are changed in two steps, but may be changed in three or more steps.

Fifth Embodiment

A fifth embodiment is described below. The following discussion focuses on a difference between the fifth embodiment and the second through fourth embodiments, and the discussion of features common to these embodiments is omitted.

In the third and fourth embodiments, two types of buffers different in size are arranged in the short TR period in the time table 121a. However, the buffers of one size only may be used. This case applies to the fifth embodiment. The relay apparatus of the fifth embodiment is identical to the relay apparatus of the second embodiment. In the fifth embodiment, names and symbol numbers of elements identical to those in the second embodiment are used. In the fifth embodiment, a time table and a buffer management table for use in the scheduling are different from those of the second embodiment. Also in the fifth embodiment, the selector 150 reads from both the short TR buffer and the long TR buffer as illustrated in FIG. 16.

Figure 29A:
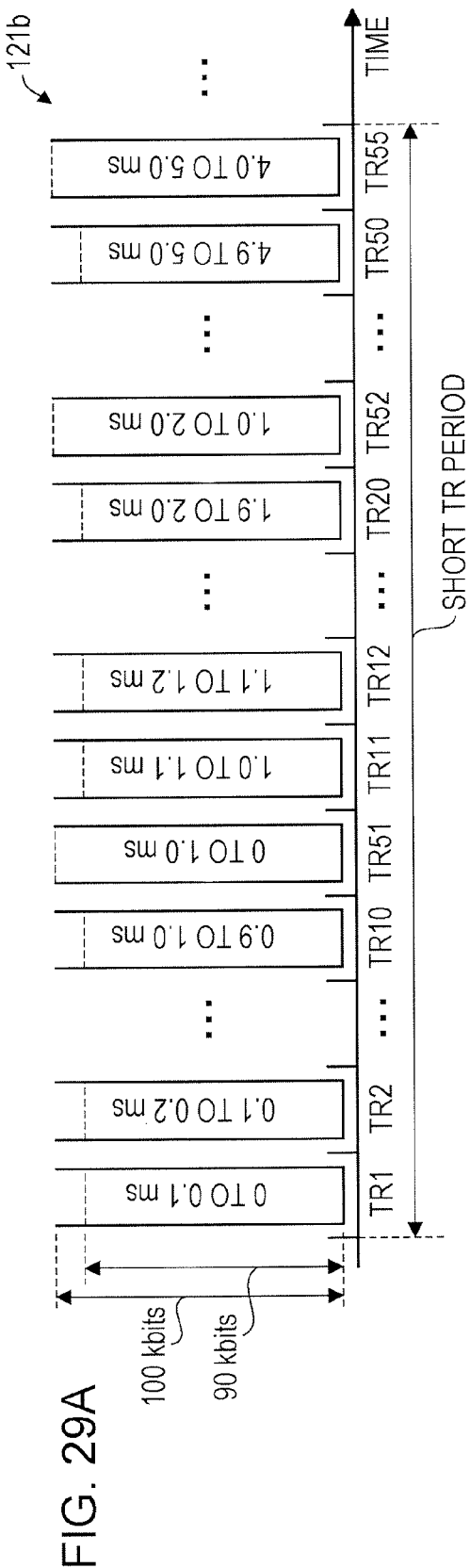
FIG. 29A and FIG. 29B illustrate an example of a time table of a fifth embodiment.
Figure 29B:
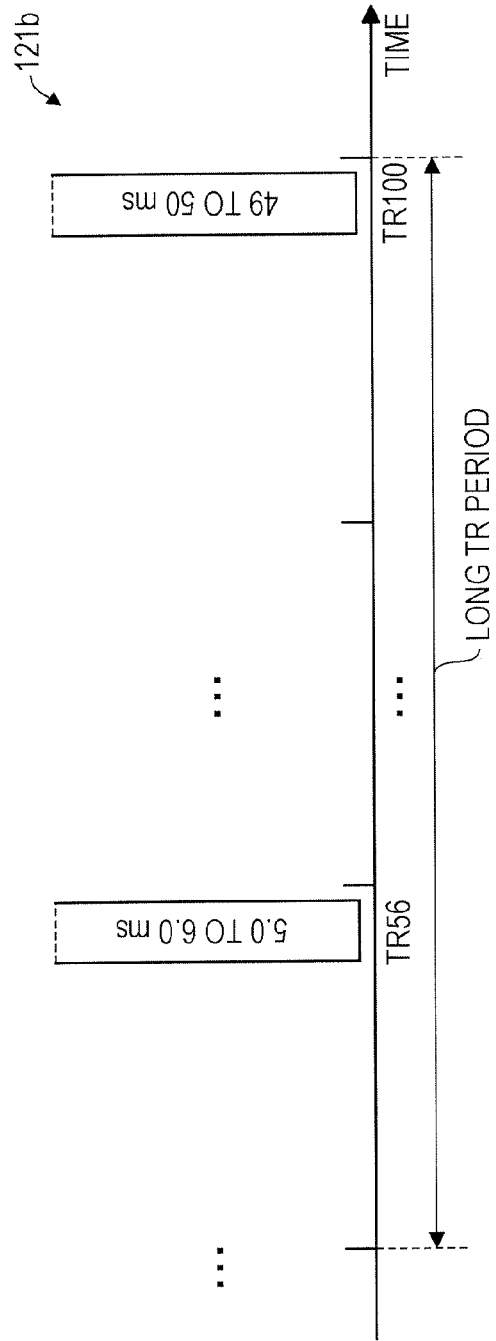

FIG. 29A and FIG. 29B illustrate an example of a time table 121b of the fifth embodiment. FIG. 29A illustrates time regions from the current point of time to 5 ms later. FIG. 29B illustrates time regions from 5 ms later onward. The time table 121b is stored in place of the time table 121 on the storage unit 120. In the fifth embodiment, two buffer groups are used.

The buffers in a first group are associated with time regions that are formed by segmenting the duration from the current point of time to 5 ms later by a unit of 0.1 ms. The buffers in a second group are associated with time regions that are formed by segmenting the duration from the current point of time to 50 ms later by a unit of 1 ms. The buffers as a target to be read in the first group are switched in steps of 0.1 ms. The buffers as a target to be read in the second group are switched in steps of 1 ms.

A time band from the current point of time (a time point of 0) to 0.1 ms later is the time region TR1. A time band from 0.1 ms later to 0.2 ms later is the time region TR2. A total number of 50 time regions is defined by segmenting the duration until 5 ms later by a unit of 0.1 ms. More specifically, there are present the time regions TR1, TR2, . . . , and TR50. The buffers in the first group are thus associated with the time regions, each shorter than the time region of each buffer of the second group. A period from the current point of time to 5 ms later, with which the buffers in the first group are associated, are referred to as a short TR period.

A time band from the current point of time (a time point of 0) to 1.0 ms later is a time region TR51. A time band from 1.0 ms later to 2.0 ms later is a time region TR52. A total number of 50 time regions is thus defined by segmenting the duration from the current point of time to 50 ms later by a unit 1.0 ms. More specifically, there are present time regions TR51, TR52, . . . , and TR100. Each buffer in the second group is thus associated with a time region longer in time length than the time region of each buffer in the first group. A period from 10 ms later to 50 ms later allocated to the buffers in the second group is referred to as a long TR period.

The size of the buffers in the first group is set to be 90 kbits. The size of the buffers in the second group is set to be 100 kbits. The size of the buffers in the first group is set to be smaller than the size of the buffers in the second group by 10 kbits. This is intended to read from the buffer in the second group in the same time band as well. A total size of the buffers of the buffer module 130 is 9.5 Mbits.

FIG. 30 illustrates an example of a buffer management table 122b of the second embodiment. The buffer management table 122b is stored in place of the buffer management table 122 on the storage unit 120. The buffer management table 122b includes items for TRs, upper limit values, current queue lengths, flags currently being read, and TR types. Contents of the TRs, the upper limit values, the current queue lengths, and the flags currently being read are identical to the contents of the buffer management table 122. Information indicating a time width of a corresponding time region is listed at the item of the TR types. The contents of the buffer management table 122b are identical to the contents of the buffer management table 122a except that buffers of one size only (90 kbits) are set in the short TR period on the buffer management table 122b.

As described above, the short TR period is not divided into multiple sizes.

The buffering process of the fifth embodiment may be identical to the buffering process of the third and fourth embodiments. For example, a single flow may be scheduled using both the short TR buffer and the long TR buffer. The scheduling may be performed using one the short TR buffer and the long TR buffer that is determined by the flow.

Sixth Embodiment

A sixth embodiment is described. The following discussion focuses on a difference between the sixth embodiment and the second through fifth embodiments, and the discussion of features common to the these embodiments is omitted herein.

The transfer rate of the flow set by the relay apparatus may be modified in accordance with the contract with users and the usage status of service. For example, a flow may be newly added or an existing flow may be deleted. The preset transfer rate of the flow may be increased or decreased. The size of each buffer may be changed in response to such setting modifications.

The relay apparatus of the sixth embodiment is identical to the relay apparatus of the second embodiment. In the sixth embodiment, names and symbol numbers of elements identical to those in the second embodiment are used. The sixth embodiment is different from the second embodiment in that the storage unit 120 stores a band management table 124 to manage the band of the relay apparatus 100. The sixth embodiment is also different from the second embodiment in that the controller 140 modifies the size of the buffer corresponding to each time region in accordance with the band management table 124.

FIG. 31 illustrates an example of the band management table 124 of the sixth embodiment. The band management table 124 is stored on the storage unit 120. The band management table 124 includes items for a rate designate, a rate upper limit value, a user count counter, and a cumulative band counter.

A number indicating a rate designate is listed at the item of the rate designate. A transfer upper rate value of the rate designate is listed at the item of the rate upper rate value. The user may contract at an upper limit rate not exceeding the rate upper limit value of each rate designate. The number of users who communicate at the rate designate is listed at the item of the user count counter. Listed at the item of the cumulative band counter is information that indicates a cumulative band of the transfer rate specified in the contract with each user.

For example, the band management table 124 stores information including "1" as the rate designate, "500 Mbps" as the rate upper limit, "3" as the user count counter, and "912 Mbps" as the cumulative band counter. The information means that the upper limit of the transfer rate at the rate designate "1" is 500 Mbps, that the number of users under contract is three, and that the cumulative band of the transfer rate in contract with the three users is 912 Mbps.

In the band management table 124, the larger the rate upper value is, the higher rate the flow is. For example, among three rate designates, a flow belonging to the rate designate "1" has the highest rate. A flow belonging to the rate designate "2" has the next highest rate. A flow belonging to the rate designate "3" has the lowest rate.

Figure 32:
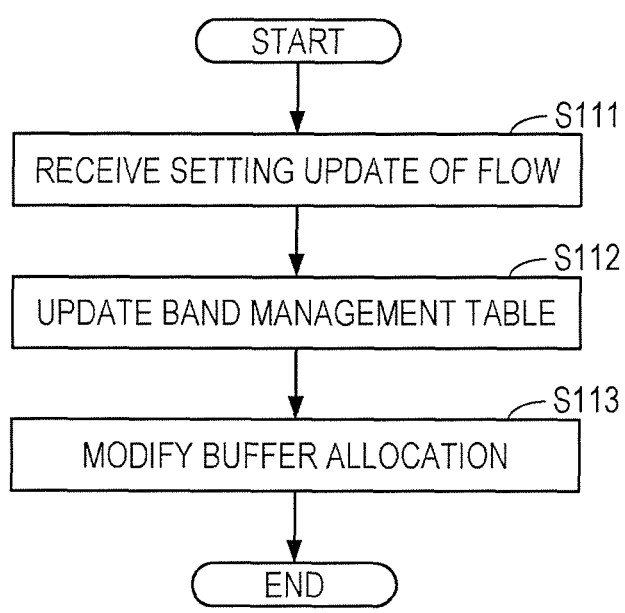
FIG. 32 is a flowchart illustrating an example of buffer capacity updating of the sixth embodiment.

FIG. 32 is a flowchart illustrating an example of buffer capacity updating of the sixth embodiment. The process of FIG. 32 is described with reference to step numbers.

Step S111: The controller 140 receives a setting update of flow.

Step S112: The controller 140 updates the band management table 124 stored on the storage unit 120. For example, if a contract of 9 Mbps as a new rate upper limit value is added, 1 is added to the user count counter of the rate designate "3". Also in the band management table 124, 9 Mbps is added to the cumulative band counter.

Step S113: The controller 140 updates the setting on the buffer management table 122 stored on the storage unit 120 in accordance with the updated band management table 124. For example, the following setting update may be contemplated. In the time table 121 stored on the storage unit 120, the time regions TR1 through TR50 are associated with the rate designate "1", the time regions TR51 through TR100 are associated with the rate designate "2", and the time regions TR101 through TR350 are associated with the rate designate "3". The buffer capacity responsive to the cumulative band counter value stored on the band management table 124 is allocated at each rate designate.

More specifically, if the cumulative band counter at the rate designate "3" is 85.5 Mbps, a buffer of 8.55 kbits may be arranged every 0.1 ms over the time regions TR101 through TR350. The buffers of the number equal to the number of packets that may be stored in the time regions TR101 through TR350 are thus prepared. For example, if a flow of 9 Mbps is added at the rate designate "3", the cumulative band is 94.5 Mbps. This means that a buffer of 9.45 kbits is simply arranged every 0.1 ms over the time regions TR101 through TR350. The controller 140 increases the size of the buffer in each of the time regions TR101 through TR350 by 0.9 kbits.

FIG. 33A and FIG. 33B illustrate an example of the buffer capacity updating of the sixth embodiment. FIG. 33A illustrates a buffer capacity before updating. FIG. 33B illustrates an updated buffer capacity. The buffer capacity before updating is 85.5 Mbps as the cumulative band counter at the rate designate "3". A buffer having a size of 8.55 kbits corresponding to each of the time regions TR101 through TR350 is arranged every 0.1 ms (from 10 ms later to 35 ms later along the time axis). If a flow of 9 Mbps is added at the rate designate "3", each of the buffers corresponding to the time regions TR101 through TR350 is increased by 0.9 kbits.

As illustrated in FIG. 33B, a buffer having a size of 9.45 kbits corresponding to each of the time regions TR101 through TR350 is arranged every 0.1 ms. A total of 225 kbits is further allocated to the time regions TR101 through TR350. For example, part of the size of the time regions TR1 through TR50 (0 to 5 ms along the time axis) corresponding to the rate designate "1" may be reduced (toward the time region TR50). As illustrated in FIG. 33B, the size of each of the buffers corresponding to time regions TR41 through TR50 (4 ms later to 5 ms later) is modified from 100 kbits to 56.75 kbits. In other words, a border where the sizes of the buffers are changed is shifted from 5 ms later to 4 ms later. In this way, the capacity for the low rate flow is reserved. The controller 140 may control an amount of shift of the border in time in view of a desired capacity. If a memory capacity of 225 kbits is desired, the amount of shift may be 0.3 ms. This is intended to use the available memory area efficiently.

The controller 140 thus modifies the size of each buffer in response to the setting modification of the flow. If the number of low rate flows is relatively large, the number of buffers in the future may be set to be relatively large. This controls the insufficiency of buffer capacity at each low rate flow.

As described above, a single buffer is associated with each of the time regions TR1, TR2, . . . . Each buffer may be considered as a set of multiple slots.

Figure 34:
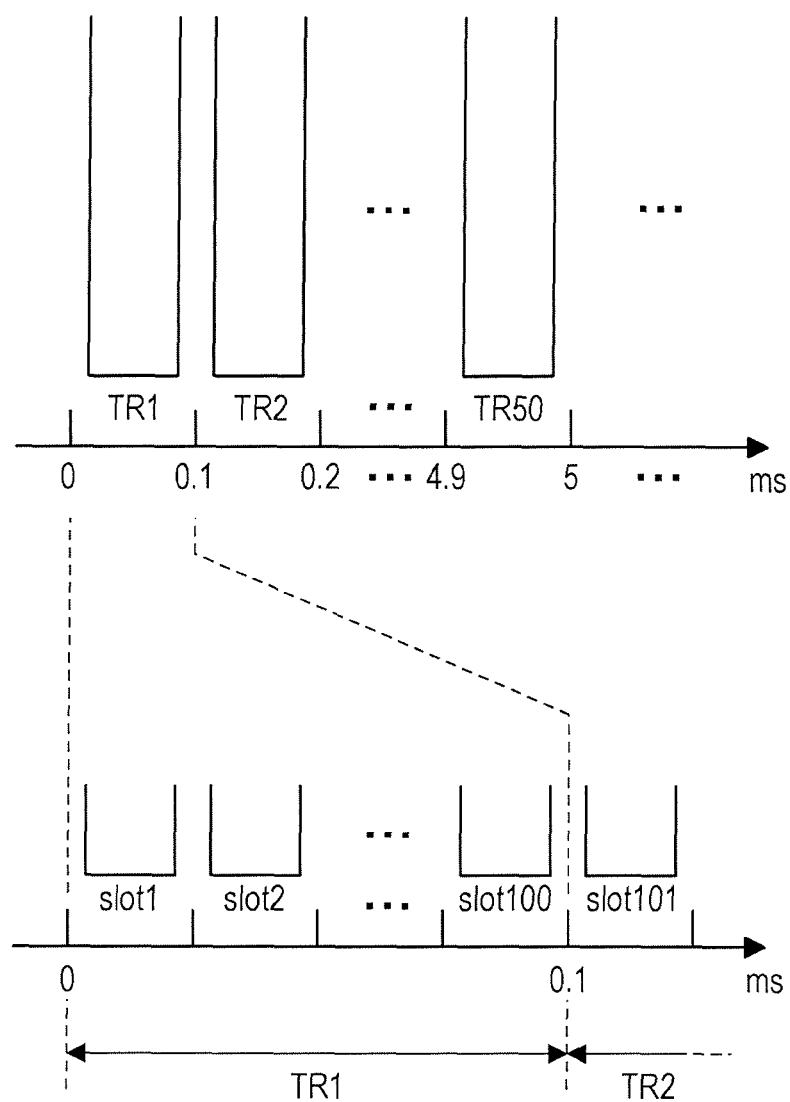
FIG. 34 illustrates another example of buffer.

FIG. 34 illustrates another example of buffer. For example, the buffer corresponding to the time region TR1 includes a set of multiple slots (slot 1, slot 2, . . . , and slot 100 in FIG. 34), each having a fixed length. The size of the buffer is the size of the sum of multiple slots. Even in such a case, the size of the buffer may be adjusted by increasing or decreasing the number of slots at each of the time regions TR1, TR2, . . . . Even when the scheduling is performed using the slots, the methods of the second through sixth embodiments are still applicable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay apparatus configured to transfer data including an identifier corresponding to a transfer rate of data and store the data as a transfer target to adjust the transfer rate, the relay apparatus comprising:
   multiple buffers respectively associated with multiple time regions that serve as targets to be successively read from a current instance of time, each buffer having a capacity to store an amount of data determined in accordance with the transfer rate of the identifier; and
   a controller configured to reduce a size of a buffer associated with a second time region to be smaller than a size of a buffer associated with a first time region that is prior to the second time region, in accordance with a time difference between the current instance of time and the second time region.

2. The relay apparatus according to claim 1, wherein the controller is further configured to modify sizes of the multiple buffers in accordance with a modification of setting of the transfer rate of data corresponding to the identifier.

3. The relay apparatus according to claim 1, further comprising:
   remaining multiple buffers respectively associated with remaining multiple time regions, each remaining time region longer in time width than each of the multiple buffers, each remaining buffer having a capacity to store an amount of data determined in accordance with the transfer rate of the identifier; and
   a selector configured to read data from any of the multiple buffers and the remaining multiple buffers.

4. The relay apparatus according to claim 3, wherein in order to read the data from both a first buffer selected from the multiple buffers and a second buffer selected from the remaining multiple buffers within one unit time, the selector is configured to read the second buffer subsequent to completing of reading the first buffer.

5. The relay apparatus according to claim 3, wherein in order to read the data from both a first buffer selected from the multiple buffers and a second buffer selected from the remaining multiple buffers within one unit time, the selector is configured to switch between the first buffer and the second buffer to read the data therefrom in accordance with specific weights respectively assigned to the first buffer and the second buffer.

6. The relay apparatus according to claim 3, wherein the controller is further configured to store the data in the multiple buffers with a higher priority than in the remaining multiple buffers.

7. The relay apparatus according to claim 3, wherein the controller is further configured to determine one of the multiple buffers and the remaining multiple buffers to store the data in accordance with the transfer rate of data corresponding to the identifier of the data.

8. The relay apparatus according to claim 1, wherein the controller is further configured to reduce the size of the buffer associated with the second time region having the time difference equal to or greater than a threshold value to be smaller than the size of the buffer associated with the first time region that is prior to the second time region.

9. The relay apparatus according to claim 1, wherein the identifier of the data is configured to identify a flow of data, and the transfer rate of data is determined based on the flow of data.

10. The relay apparatus according to claim 9, wherein the flow of data comprises information corresponding to a virtual local area network identifier (VLAN ID) contained in the data arriving at the relay apparatus.

11. The relay apparatus according to claim 1, wherein each buffer of the multiple buffers is configured to store packets of multiple flows of data.

12. A method for controlling a size of a buffer to be executed by a relay apparatus configured to transfer data including an identifier corresponding to a transfer rate of data and store the data as a transfer target to adjust the transfer rate, the relay apparatus including multiple buffers respectively associated with multiple time regions that serve as targets to be successively read from a current instance of time, each buffer having a capacity to store an amount of data determined in accordance with the transfer rate of the identifier, the method comprising
   controlling to reduce a size of a buffer associated with a second time region to be smaller than a size of a buffer associated with a first time region that is prior to the second time region in accordance with a time difference between the current instance of time and the second time region.

13. The method according to claim 12, wherein the controlling comprises modifying sizes of the multiple buffers in accordance with a modification of setting of the transfer rate of data corresponding to the identifier.

14. The method according to claim 12,
   wherein the relay apparatus further includes remaining multiple buffers respectively associated with remaining multiple time regions, each remaining time region being longer in time width than each of the multiple buffers, each remaining buffer having a capacity to store an amount of data determined in accordance with the transfer rate of the identifier; and
   wherein the method further comprises selecting any of the multiple buffers and the remaining multiple buffers to read data therefrom.

15. The method according to claim 14, wherein the selecting comprises reading a second buffer subsequent to completing of reading a first buffer in order to read from both the first buffer selected from the multiple buffers and the second buffer selected from the remaining multiple buffers within one unit time.

16. The relay apparatus according to claim 14, wherein the selecting comprises switching between a first buffer and a second buffer to read data therefrom in accordance with specific weights respectively assigned to the first buffer and the second buffer, in order to read from both the first buffer selected from the multiple buffers and the second buffer selected from the remaining multiple buffers within one unit time.

17. The method according to claim 14, wherein the controlling further comprises storing data in the multiple buffers with a higher priority than in the remaining multiple buffers.

18. The method according to claim 14, wherein the controlling further comprises determining one of the multiple buffers and the remaining multiple buffers to store data in accordance with the transfer rate corresponding to the identifier of the data.

19. The method according to claim 12, wherein the controlling further comprises reducing the size of the buffer associated with the second time region having the time difference equal to or above a threshold value to be smaller than the size of the buffer associated with the first time region prior to the second time region.

* * * * *